United States Patent
Dai et al.

(10) Patent No.: US 10,661,436 B2
(45) Date of Patent: May 26, 2020

(54) ROBOT ASSEMBLING SYSTEM AND METHOD FOR ASSEMBLING MULTI-LAYER CAGE

(71) Applicants: Tyco Electronics (Shanghai) Co. Ltd., Shanghai (CN); Innogetic Technology Co., Ltd., Zhuhai (CN)

(72) Inventors: Zhiyong Dai, Shanghai (CN); Lvhai Hu, Shanghai (CN); Yingcong Deng, Shanghai (CN); Yun Liu, Shanghai (CN); Kok Wai Wong, Shanghai (CN)

(73) Assignees: Tyco Electronics (Shanghai) Co. Ltd., Shanghai (CN); Innogetic Technology Co., Ltd., Zhuhai (CN)

( * ) Notice: Subject to any disclaimer, the term of this patent is extended or adjusted under 35 U.S.C. 154(b) by 58 days.

(21) Appl. No.: 16/141,030

(22) Filed: Sep. 25, 2018

(65) Prior Publication Data

US 2019/0022852 A1    Jan. 24, 2019

Related U.S. Application Data

(63) Continuation of application No. PCT/IB2017/051656, filed on Mar. 22, 2017.

(30) Foreign Application Priority Data

Mar. 25, 2016    (CN) .......................... 2016 1 0186470

(51) Int. Cl.
*B25J 9/00* (2006.01)
*B25J 15/00* (2006.01)
(Continued)

(52) U.S. Cl.
CPC .......... *B25J 9/0096* (2013.01); *B21D 39/032* (2013.01); *B23P 21/00* (2013.01); *B23P 21/002* (2013.01);
(Continued)

(58) Field of Classification Search
CPC ........ B25J 9/0096; B25J 9/043; B25J 9/0087; B25J 9/1679; B25J 9/1687; B25J 9/1682;
(Continued)

(56) References Cited

U.S. PATENT DOCUMENTS 5,125,149 A * 6/1992 Inaba .................... B23P 19/001
198/341.05
9,137,929 B1    9/2015 Yang
(Continued)

FOREIGN PATENT DOCUMENTS

| EP | 2492055 A1 | 8/2012 |
|---|---|---|
| WO | 2007079117 A1 | 7/2007 |
| WO | 2015120024 A1 | 8/2015 |

OTHER PUBLICATIONS

PCT Notification, The International Search Report and the Written Opinion of the International Searching Authority, dated Jul. 11, 2017, 15 pages.

*Primary Examiner* — Jermie E Cozart
(74) *Attorney, Agent, or Firm* — Barley Snyder

(57) ABSTRACT

A robot assembling system for assembling a multi-layer cage comprises a first assembling workstation, a second assembling workstation, a third assembling workstation, and a robot. The multi-layer cage includes a bottom case, a top case, a partition plate, and a partition assembly. The first assembling workstation assembles the partition plate and the partition assembly to form a partition device. The second assembling workstation assembles the partition device and the top case to form a top case assembly. The third assembling workstation assembles the top case assembly and the bottom case to form the multi-layer cage. The robot transmits the bottom case, the top case, the partition plate, the partition assembly, the partition device, or the top case
(Continued)

assembly between the workstations. The robot assists an assembly process at each of the workstations.

20 Claims, 20 Drawing Sheets

(51) Int. Cl.
 *B21D 39/03* (2006.01)
 *B25J 15/02* (2006.01)
 *B25J 15/06* (2006.01)
 *B23P 21/00* (2006.01)
 *B25J 9/16* (2006.01)
 *B25J 9/04* (2006.01)
 *G02B 6/42* (2006.01)

(52) U.S. Cl.
 CPC .......... *B23P 21/004* (2013.01); *B23P 21/008* (2013.01); *B25J 9/0087* (2013.01); *B25J 9/043* (2013.01); *B25J 9/1679* (2013.01); *B25J 9/1682* (2013.01); *B25J 9/1687* (2013.01); *B25J 15/009* (2013.01); *B25J 15/0014* (2013.01); *B25J 15/0028* (2013.01); *B25J 15/0057* (2013.01); *B25J 15/0066* (2013.01); *B25J 15/0253* (2013.01); *B25J 15/0616* (2013.01); *G02B 6/4277* (2013.01); *Y10T 29/49828* (2015.01); *Y10T 29/49829* (2015.01); *Y10T 29/49904* (2015.01)

(58) Field of Classification Search
 CPC .... B25J 15/0028; B25J 15/15; B25J 15/0014; B25J 15/066; B25J 15/009; B25J 15/0616; B25J 15/0253; B25J 15/0057; B21D 39/032; B23P 21/008; B23P 21/004; B23P 21/002; B23P 21/00; Y10T 29/49828; Y10T 29/49904; Y10T 29/49829
 See application file for complete search history.

(56) References Cited

U.S. PATENT DOCUMENTS

| | | | |
|---|---|---|---|
| 2004/0055131 A1* | 3/2004 | Ghuman | ............ B23K 37/0426 29/429 |
| 2011/0135429 A1 | 6/2011 | Machida et al. | |
| 2011/0258847 A1* | 10/2011 | Meisho | .................. B23P 19/00 29/700 |
| 2015/0143676 A1* | 5/2015 | Kanayama | ............ B21D 39/032 24/697.2 |
| 2015/0171558 A1 | 6/2015 | Yu et al. | |

* cited by examiner

ROBOT ASSEMBLING SYSTEM AND METHOD FOR ASSEMBLING MULTI-LAYER CAGE

CROSS-REFERENCE TO RELATED APPLICATIONS

This application is a continuation of PCT International Application No. PCT/IB2017/051656, filed on Mar. 22, 2017, which claims priority under 35 U.S.C. § 119 to Chinese Patent Application No. 201610186470.0, filed on Mar. 25, 2016.

FIELD OF THE INVENTION

The present invention relates to a robot assembling system and, more particularly, to a robot assembling system for assembling a multi-layer cage.

BACKGROUND

A known multi-layer cage generally comprises two or more receiving chambers arranged in an array. The multi-layer cage may include a top case and a bottom case arranged to define an inner space, and a plurality of partition assemblies and a partition plate arranged in the inner space. The partition plate and the partition assemblies are mounted vertically and horizontally in the inner space and divide the inner space into a plurality of receiving chambers. Generally, the top case comprises a top plate and two side walls, which are formed integrally.

In the prior art, the multi-layer case is generally assembled manually. First, an operator must bend the top case by hand or with a tool and assemble the partition plate and the partition assembly to the top case to form a top case assembly. Then, the operator must manually assemble the bottom case to the top case assembly. During the process of manual assembly, the operator must correctly insert all latches of the partition assembly into slots formed in sidewalls of the top case and the partition plate, and insert pins or protrusions of the partition plate into slots formed in the top case and the bottom case. Because there are strict tolerance requirements between these cases in the assembly process, the assembly process is difficult for the operator, and the assembly efficiency is very low. Furthermore, the operator's fingers may be hurt by sharp edges or pins of these cases, and there is a safety hazard in the manual assembly of these cases.

SUMMARY

A robot assembling system for assembling a multi-layer cage comprises a first assembling workstation, a second assembling workstation, a third assembling workstation, and a robot. The multi-layer cage includes a bottom case, a top case, a partition plate, and a partition assembly. The first assembling workstation assembles the partition plate and the partition assembly to form a partition device. The second assembling workstation assembles the partition device and the top case to form a top case assembly. The third assembling workstation assembles the top case assembly and the bottom case to form the multi-layer cage. The robot transmits the bottom case, the top case, the partition plate, the partition assembly, the partition device, or the top case assembly between the workstations. The robot assists an assembly process at each of the workstations.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
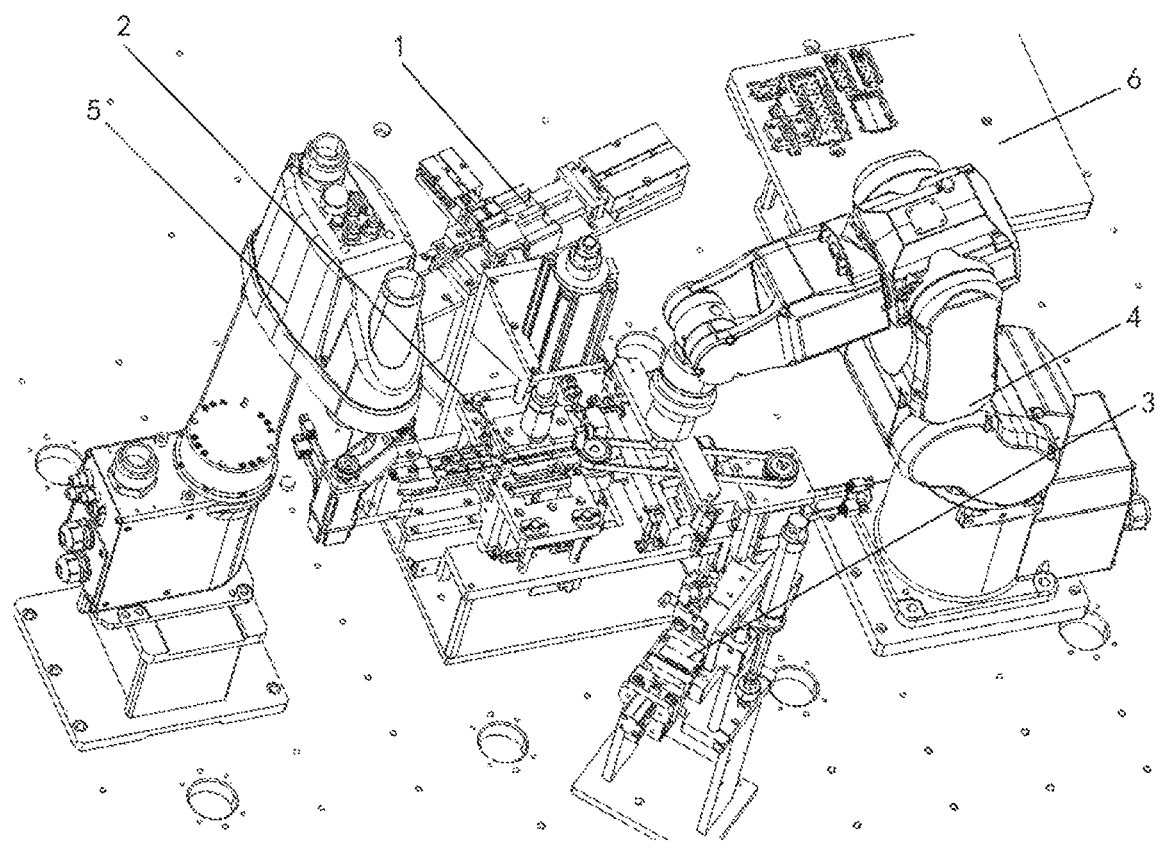
FIG. 1 is a perspective view of a robot assembling system according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

A robot assembling system according to an embodiment is shown in FIG. 1. The robot assembling system is adapted to assemble a multi-layer cage shown in FIGS. 2 and 3.

Figure 2:
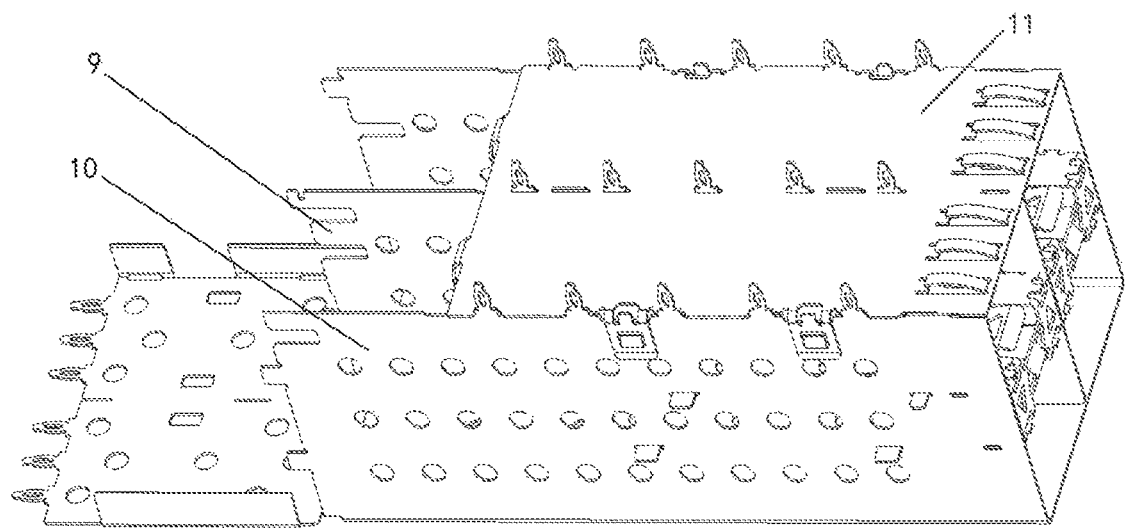
FIG. 2 is a perspective view of a multi-layer cage.
Figure 3:
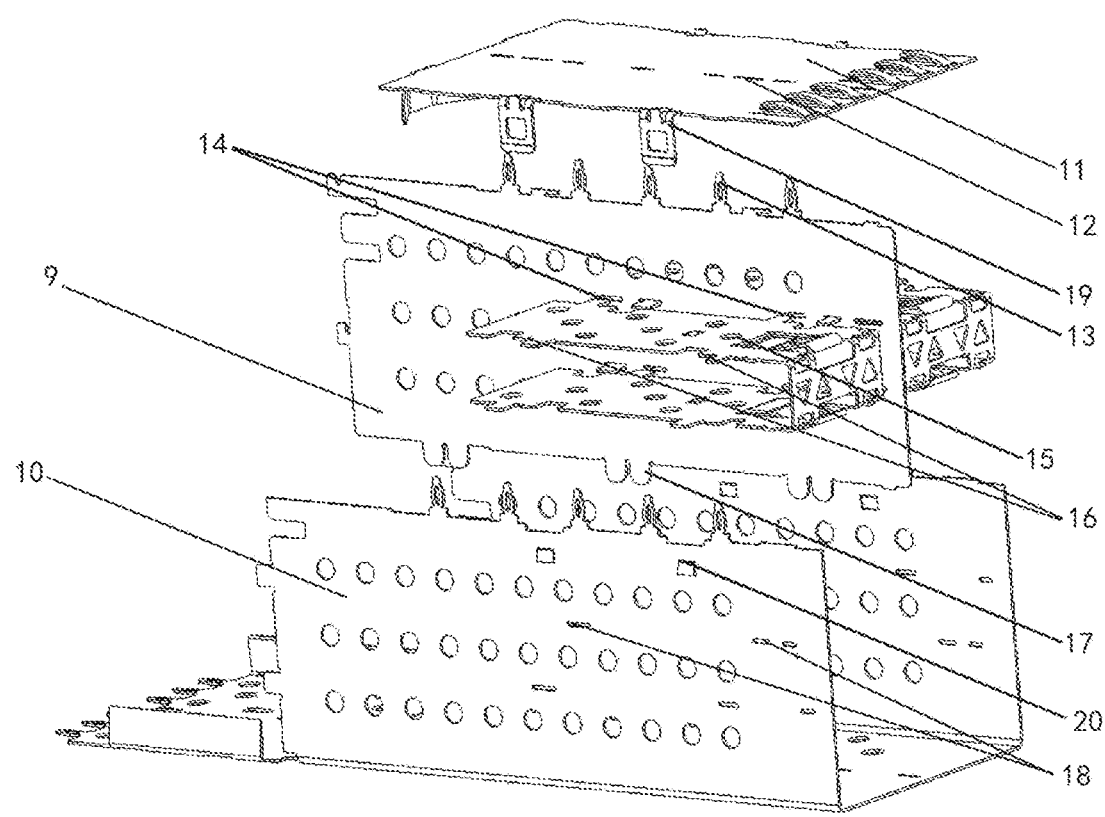
FIG. 3 is an exploded perspective view of the multi-layer cage.

As shown in FIGS. 2 and 3, the multi-layer cage includes two layers of cases with a top case 10, a partition plate 9, a bottom case 11 and two partition assemblies 15. The top case 10 includes a top wall and two sidewalls integrally formed with the top wall. Each partition assembly 15 has a substantial U-shape. A plurality of latches 14 are formed on the inner side of each partition assembly 15 and are constructed to be respectively inserted into a plurality of slots formed in the partition plate 9. A plurality of latches 16 are formed on the outer side of each partition assembly 15 and constructed to be inserted into a plurality of slots 18 formed in the sidewall of the top case 10. A plurality of protrusions 17 formed on the bottom side of the partition plate 9 are constructed to be inserted into a respective slot formed in the top wall of the top case 10. A plurality of pins 13 formed on the top side of the partition plate 9 are constructed to be inserted into a respective slot 12 formed in bottom case 11. A plurality of hooks 19 formed on the bottom case 11 are constructed to be engaged to a respective clip 20 provided on the sidewall of the top case 10.

The robot assembling system, as shown in FIG. 1, includes a first assembling workstation 1 configured to assemble the partition plate 9 and the partition assembly 15, so as to form a partition device 150; a second assembling workstation 2 configured to assemble the partition device 150 and the top case 10 to form a top case assembly 100; a third assembling workstation 3 configured to assemble the top case assembly 100 and the bottom case 11 to form the multi-layer cage; a first robot 4 configured to transmit and load various components of the multi-layer cage to respective assembling workstation 1 or 2; a second robot 5 configured to transmit and load the partition device 150 or the top case assembly 100 between the assembling workstations 1, 2 or 3, and assist an assembly process at each assembling workstation 1, 2, 3. In an embodiment, the first robot 4 is a six-axis robot and the second robot 5 is a four-axis robot. The robot assembling system further comprises, as shown in FIGS. 1 and 5, a storage tray 6 for storing the components of the multi-layer cage.

Although two robots 4, 5 are shown in the illustrated embodiments, functions of the two robots 4, 5 may be achieved by a single robot, for example, the second robot 5 may comprise a further operation arm for performing the loading and transmitting functions of the first robot 4. In addition, in other embodiments, the robots 4, 5 may be any other type of multi-freedom robot. These robots 4, 5 may be configured to identify components based on the preset program, so as to control a gripper to grab the corresponding component, and place the gripped component on a predetermined position.

Figure 4:
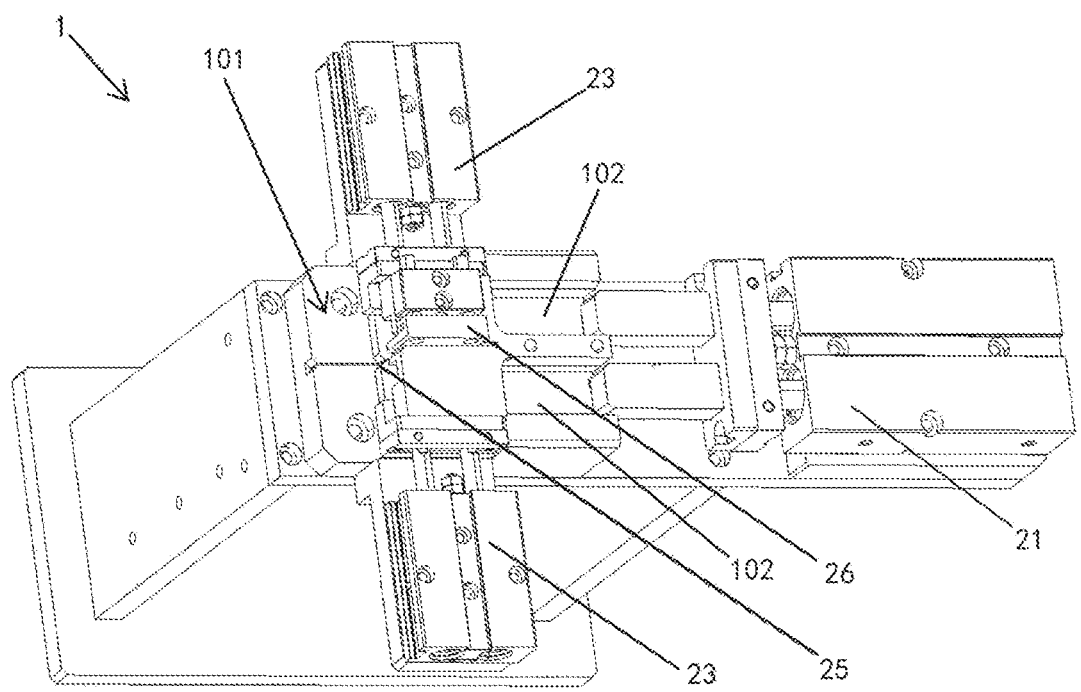
FIG. 4 is a perspective view of a first assembling workstation of the robot assembling system.
Figure 20:
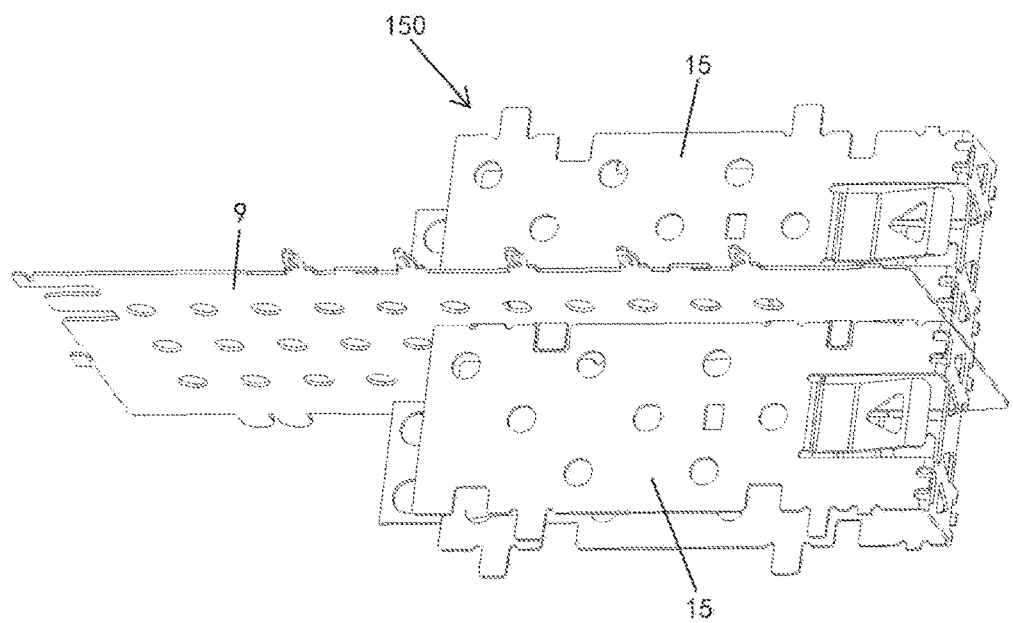
FIG. 20 is a perspective view of the partition device.

The first assembling workstation 1, as shown in FIG. 4, includes a partition plate loading portion 101 configured to load the partition plate 9, a pair of partition assembly loading portions 102 configured to receive two partition assemblies 15, and a driving device configured to drive the latch 14 on the inner side of the partition assembly 15 to engage with the slot of the partition plate 9 when the partition plate 9 and the partition assembly 15 are placed on the first assembling workstation 1, so as to form the partition device 150 shown in FIG. 20. The partition plate loading portion 101 includes, as shown in FIGS. 4 and 8-20, a guide slot 25 into which the partition plate 9 is inserted and a push block 26 configured to fix the partition plate 9 in the guide slot 25 by springs. The driving device includes a first driving device 21 and a second driving device 23. The first driving device 21 is constructed to drive the partition assembly 15 in a first direction parallel to the partition plate 9. The second driving device is constructed to drive the partition assembly 15 in a second direction perpendicular to the first direction. In an embodiment, the first driving device 21 and the second driving device 23 are each an air cylinder.

Figure 5:
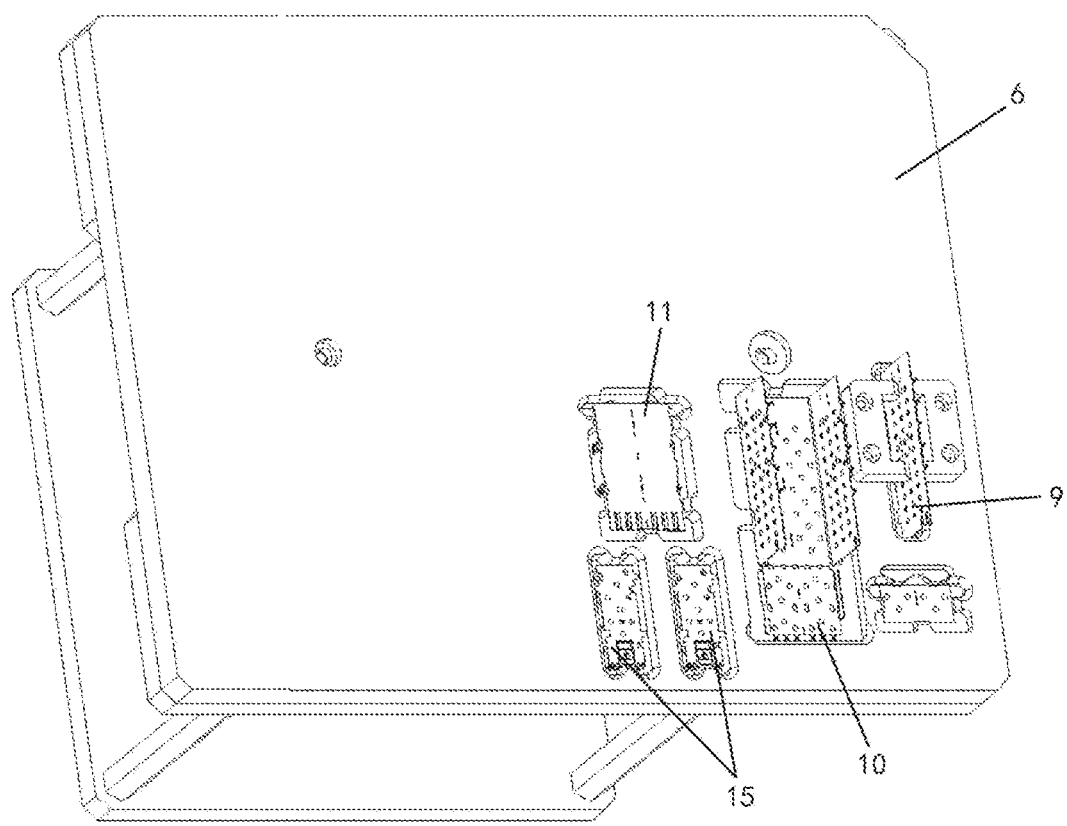
FIG. 5 is a perspective view of a storage tray of the robot assembling system.
Figure 6:
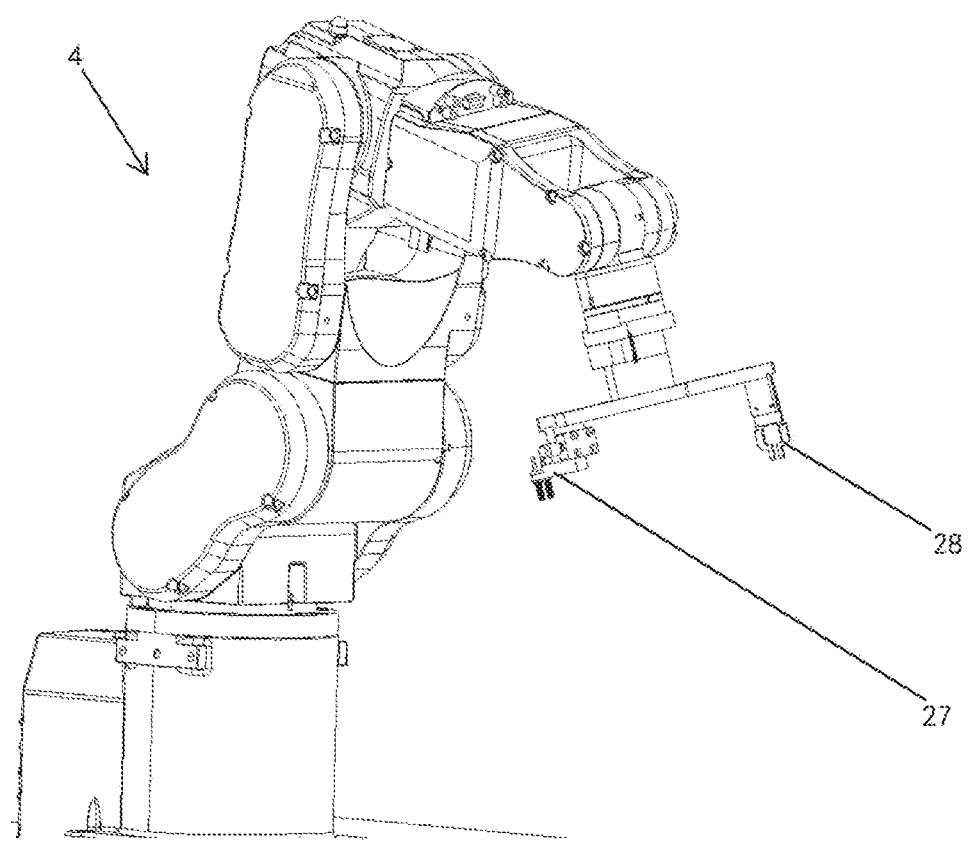
FIG. 6 is a perspective view of a first robot of the robot assembling system.
Figure 7:
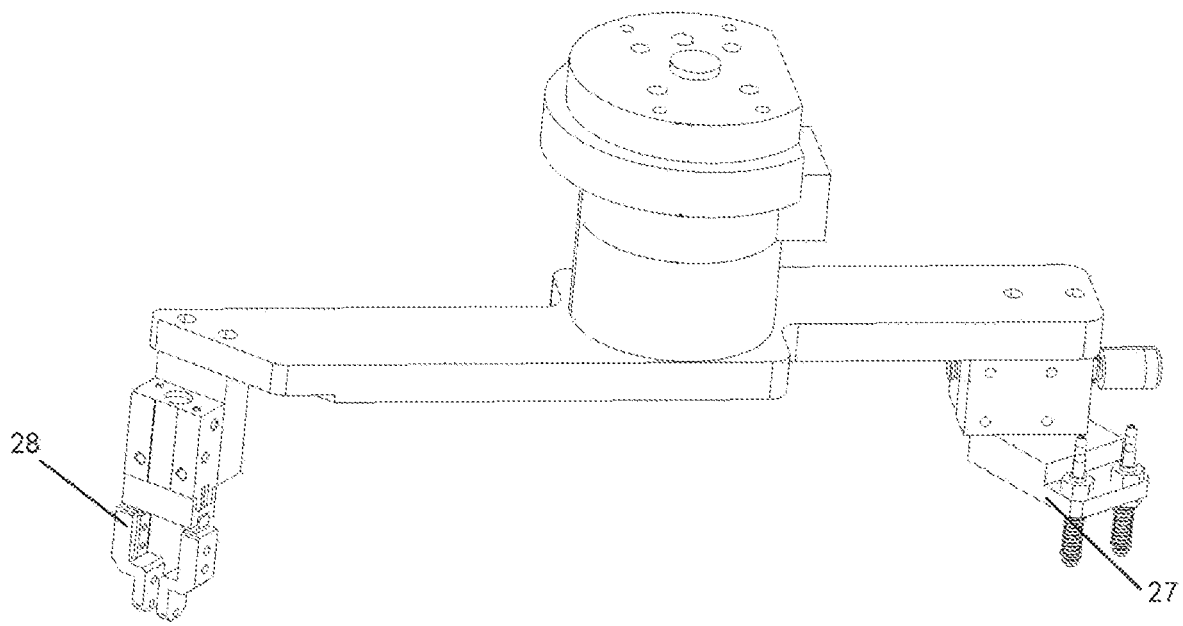
FIG. 7 is a perspective view of a gripper and a sucker of the first robot.

The first robot 4, as shown in FIGS. 6 and 7, includes a gripper 28 and a sucker 27 adapted to clamp or suck up components of the multi-layer cage from the storage tray 6 shown in FIGS. 1 and 5, and load the components to respective loading locations of a respective assembling workstation 1, 2, 3.

Figure 8:
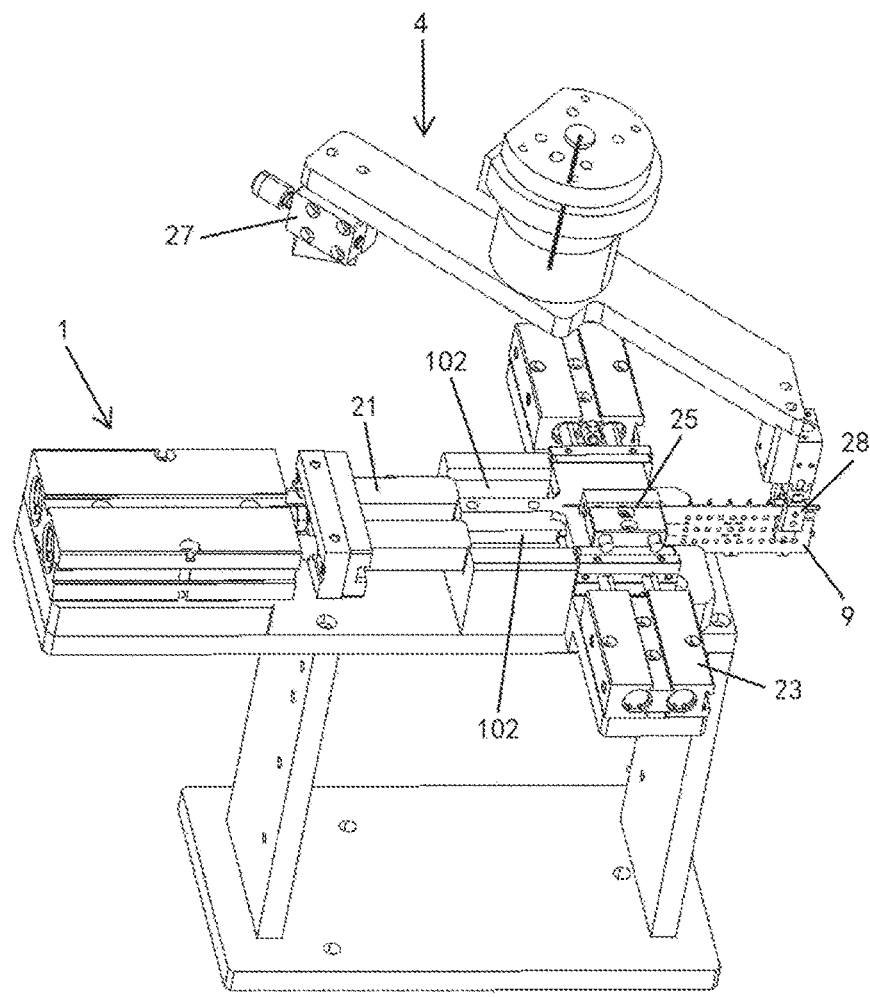
FIG. 8 is a perspective view of loading a partition plate on the first assembling workstation with the first robot.
Figure 9:
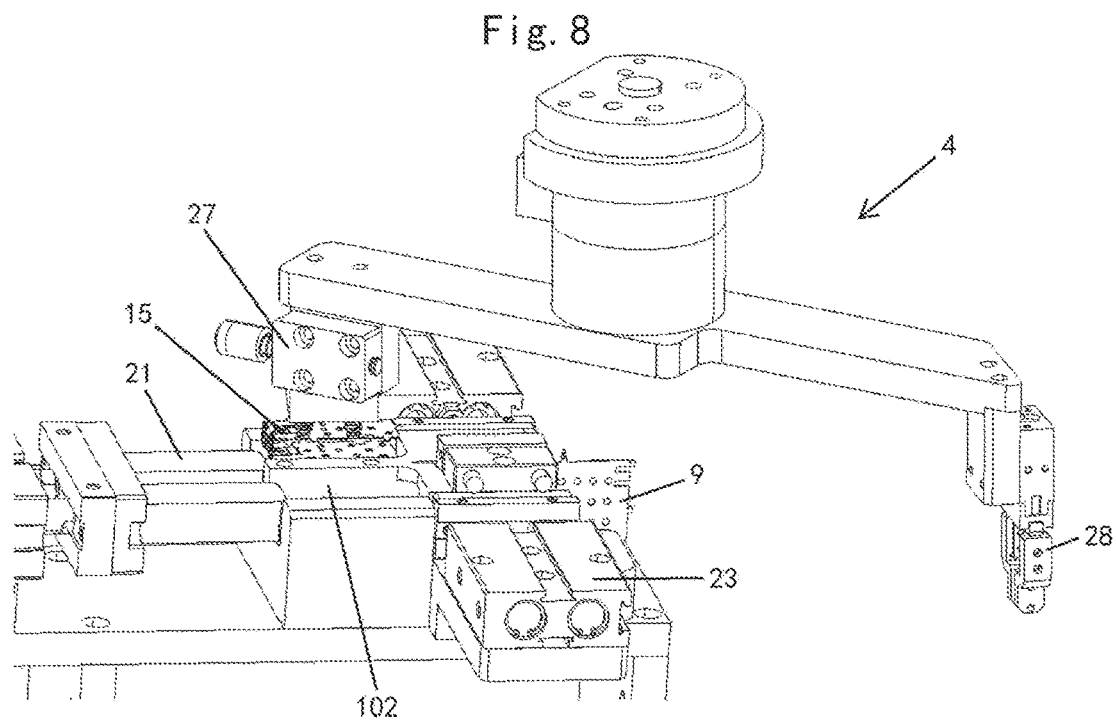
FIG. 9 is a perspective view of loading a partition assembly on the first assembling workstation with the first robot.
Figure 10:
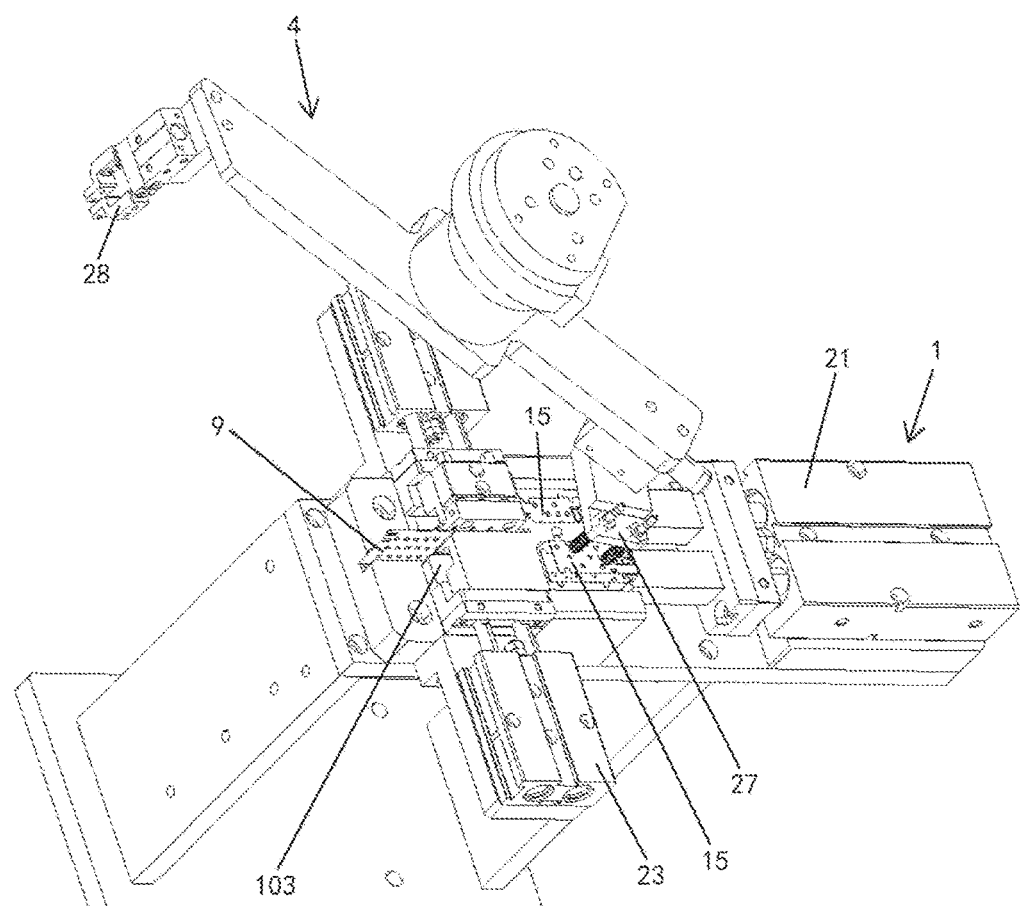
FIG. 10 is another perspective view of loading the partition assembly on the first assembling workstation with the first robot.

The first robot 4, as shown in FIGS. 8-10, loads the partition plate 9 on the first assembling workstation 1. After the first robot 4 positions the partition plate 9 and the partition assembly 15 on a loading location on the first assembling workstation 1, as shown in FIGS. 15-20, the first driving device 21 pushes the partition assembly 15 in the direction parallel to the partition plate 9, so as to move the partition assembly 15 to both sides of the partition plate 9. The second driving device 23 then pushes the partition assembly 15 in the direction perpendicular to the partition plate 9, so as to insert the latches 14 of the partition assembly 15 into the slots of the partition plate 9 to form a partition device 150 shown in FIG. 20.

Figure 11:
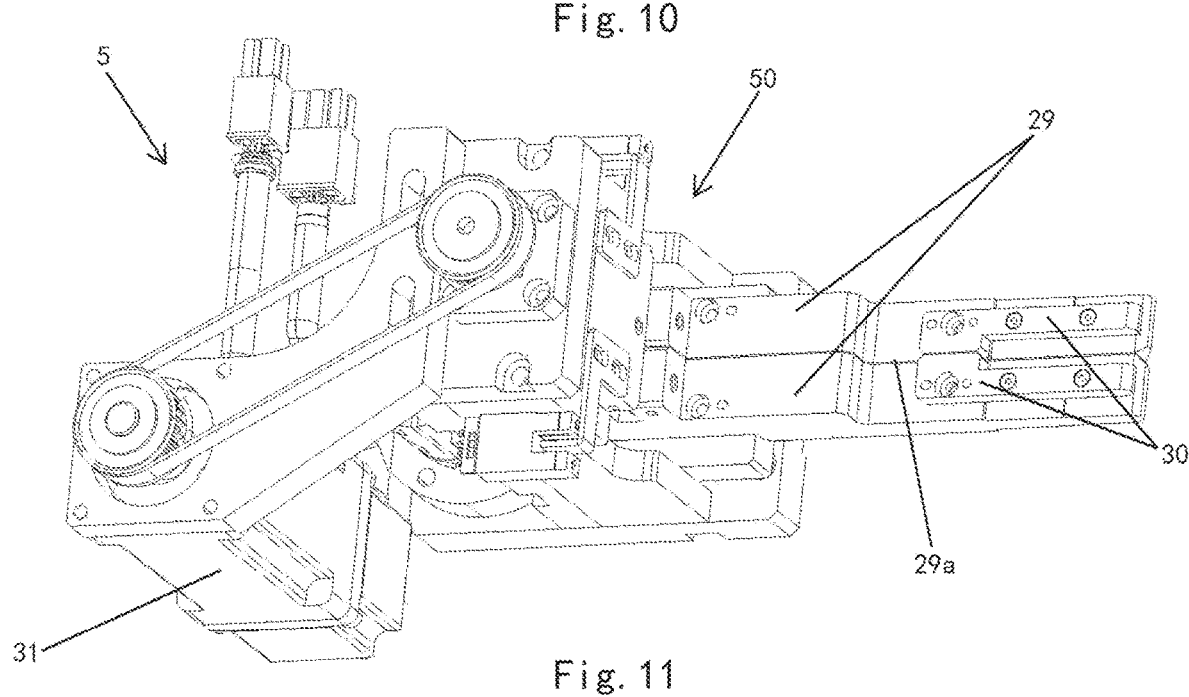
FIG. 11 is a perspective view of an operation portion of a second robot of the robot assembling system.
Figure 12:
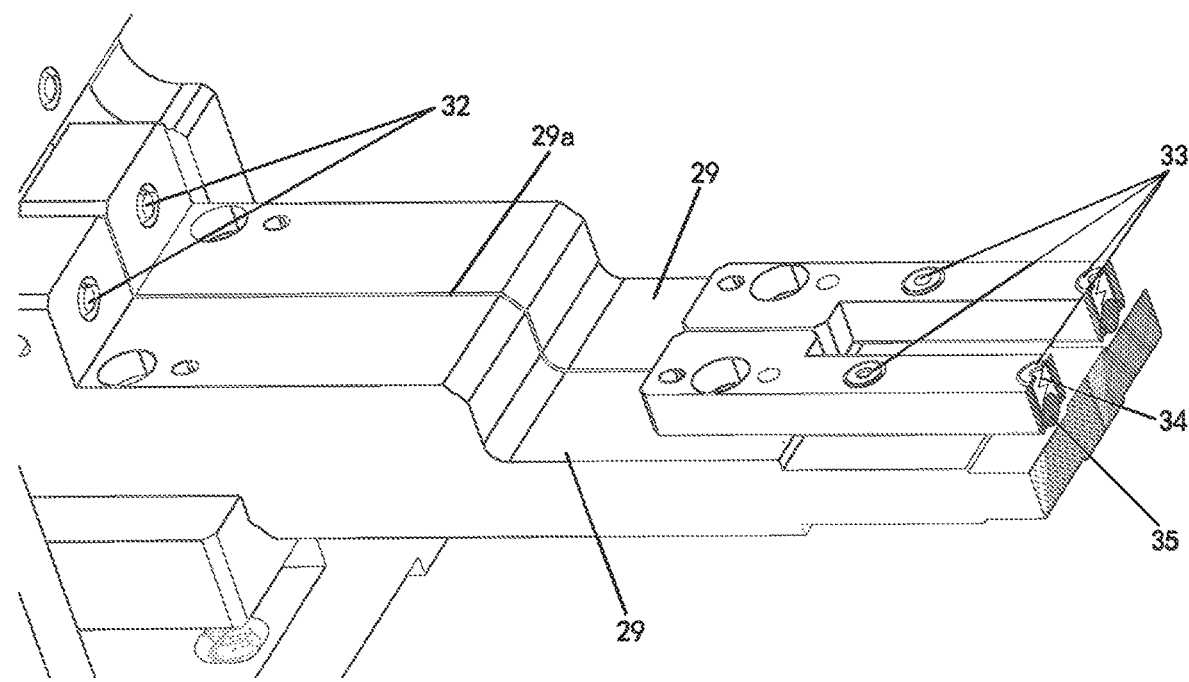
FIG. 12 is a perspective view of fingers of the second robot.
Figure 13:
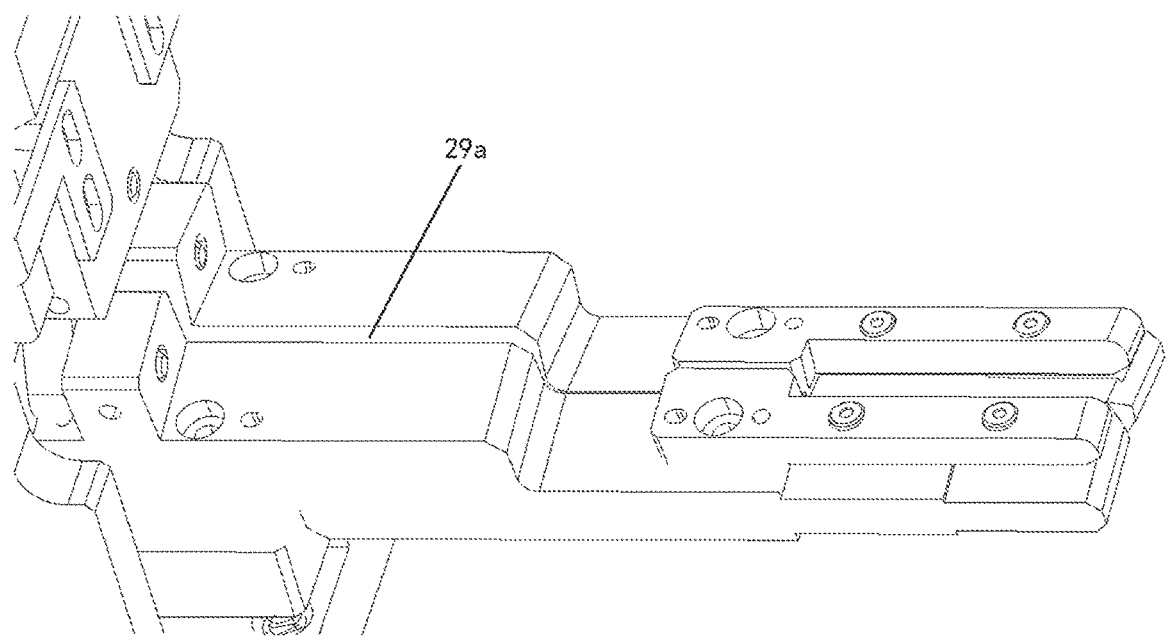
FIG. 13 is a perspective view of the fingers of the second robot in an opened state.

As shown in FIGS. 11-13, the second robot 5 includes a gripper 50 adapted to hold the partition device 150. The gripper 50 includes two fingers 29 arranged opposite to each other, the partition plate 9 is adapted to be received in a gap 29a between the two fingers 29, and the two partition assemblies 15 are adapted to be sleeved on the fingers 29. The two fingers 29 are configured to be rotatable relative to each other about a direction perpendicular to the fingers 29, so as to close or open the gap 19a between the two fingers 29. The fingers 29 are shown in the closed state in FIG. 12 and are shown in an opened state in FIG. 13. In an embodiment, the fingers 29 may be driven by motors 31, shown in FIG. 11, to rotate about axes of two pins 32. The gripper 50 includes holding blocks 30 located at both sides of each finger 29, and the holding blocks 30 are adapted to elastically press the partition assembly 15 on the finger 29 when the partition assembly 15 is sleeved on the finger 29. In an embodiment, four pins 33 are provided on the two fingers 29. A spring 34 is provided in each of the pins 33. During assembly of the partition assembly 15, the spring 34 presses a sphere 35 in a hole formed in the partition assembly 15, so as to position the partition assembly 15 and maintain the partition assembly 15 during assembly.

As shown in FIGS. 14-20, during assembly of the partition assembly 15 to the partition plate 9, the fingers 29 of the second robot 5 may be inserted into receiving portions 103 located at both sides of the partition plate 9, and loaded on the first assembling workstation 1 so as to guide the partition assembly 15 to move. After the partition device 150 is formed, the fingers 29 of the second robot 5 may remove the partition device 150 from the loading location of the first assembling workstation 1, and transmit the formed partition device 150 to a respective loading location on the second assembling workstation 2.

An operation of assembling the partition device 150 on the first assembling workstation 1 will now be described in greater detail.

First, as shown in FIG. 8, the partition plate 9 is inserted into a slit 25 formed in the loading portion 101 of the first assembling workstation 1 by the gripper 28 of the first robot 4, and the partition plate 9 is fixed on the loading location by the push block in a manner of spring loading.

Then, as shown in FIGS. 9 and 10, the two partition assemblies 15 are loaded to the loading location by the vacuum sucker 27 of the first robot 4.

Figure 14:
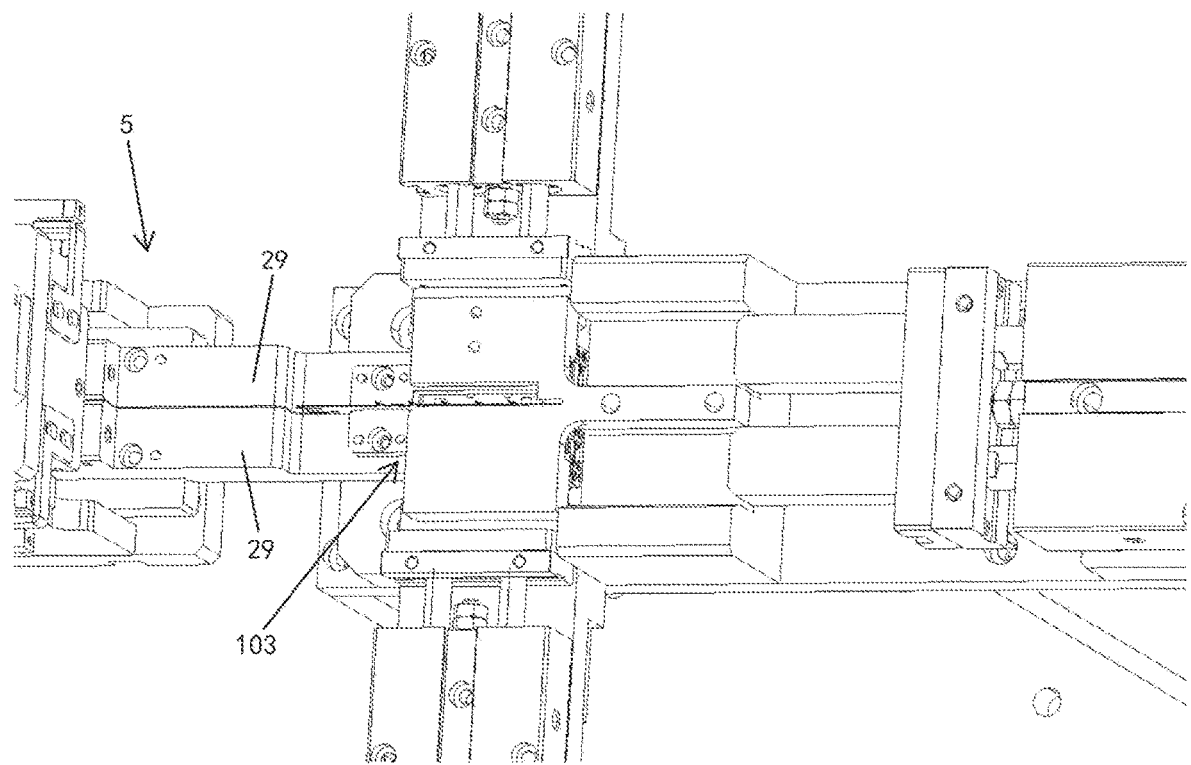
FIG. 14 is a perspective view of the fingers of the second robot engaging the first assembling workstation.
Figure 15:
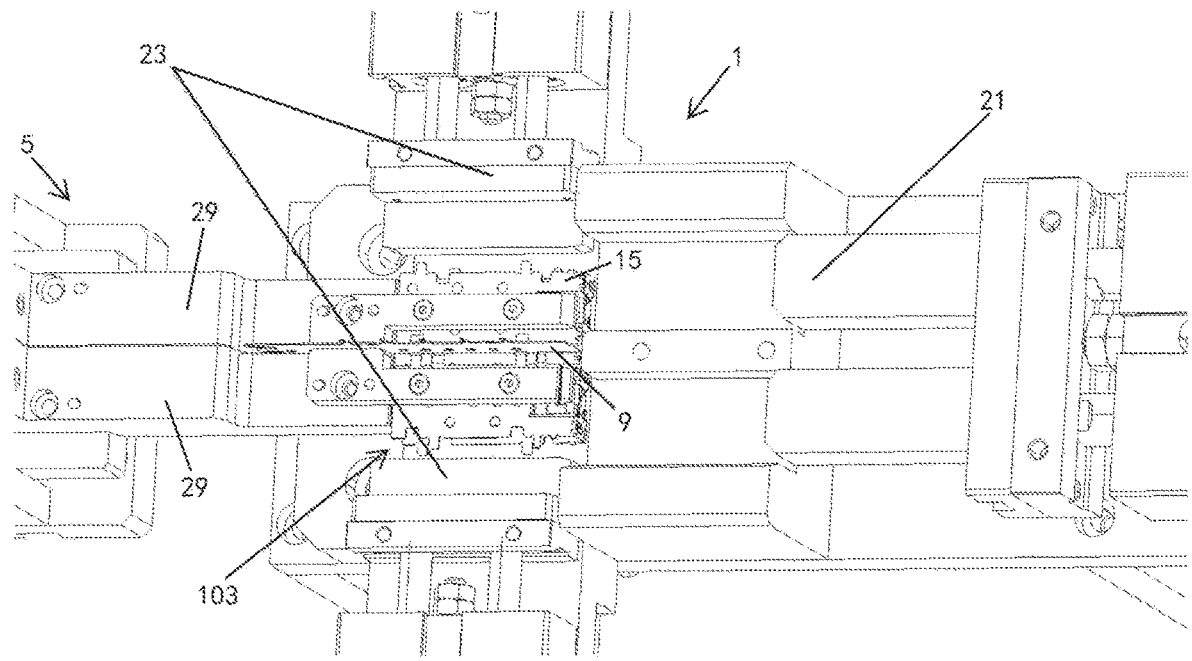
FIG. 15 is a perspective view of assembling the partition plate and the partition assembly on the first assembling workstation to form a partition device.
Figure 16:
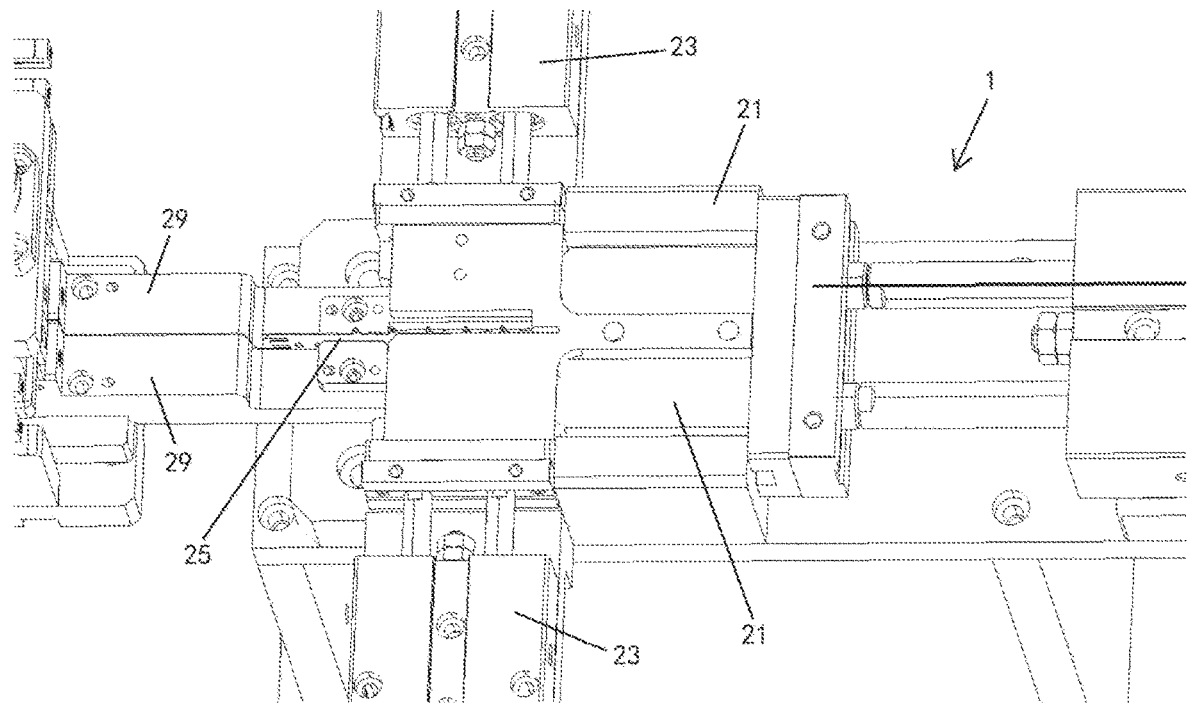
FIG. 16 is another perspective view of assembling the partition plate and the partition assembly on the first assembling workstation to form the partition device.
Figure 17:
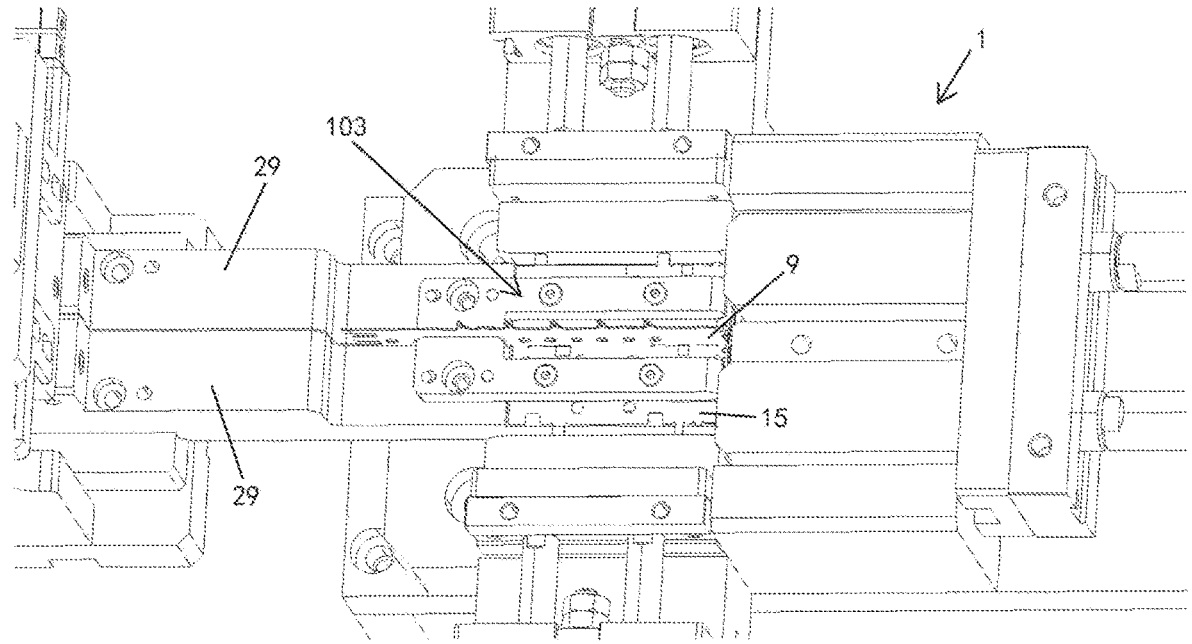
FIG. 17 is another perspective view of assembling the partition plate and the partition assembly on the first assembling workstation to form the partition device.
Figure 18:
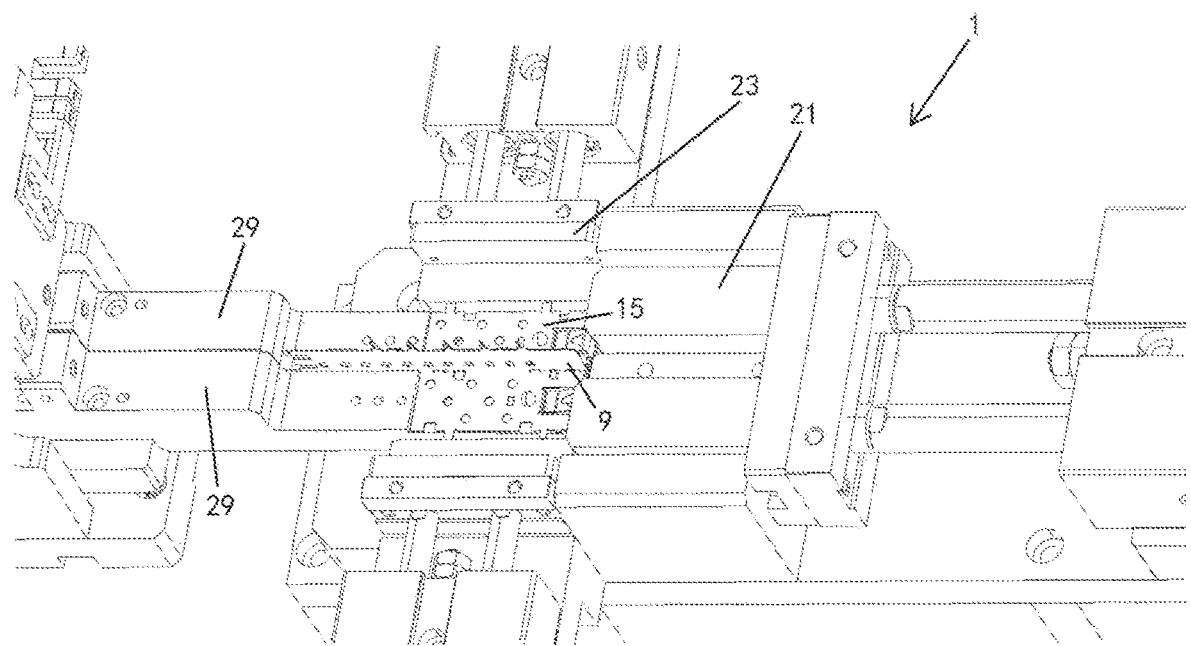
FIG. 18 is another perspective view of assembling the partition plate and the partition assembly on the first assembling workstation to form the partition device.
Figure 19:
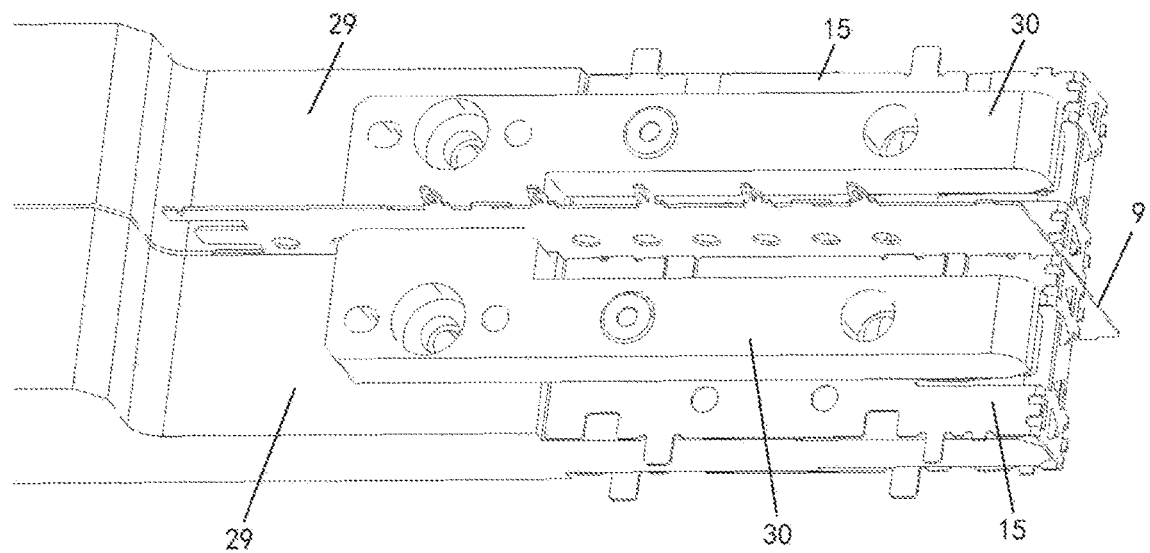
FIG. 19 is a perspective view of assembling the partition device on the fingers of the second robot.

Then, as shown in FIGS. 14 and 15, the gripper 50 of the second robot 5 is engaged to the first assembling workstation 1 by the fingers 29, so that the two fingers 29 are located at both sides of the partition plate 9, respectively, and the partition plate 9 is inserted into the gap 29a between the fingers 29.

Then, the first driving device 21 pushes the partition assembly 15 in the direction parallel to the partition plate 9, so as to move the partition assembly 15 to the both sides of the partition plate 9. The second driving device 23 then pushes the partition assembly 15 in the direction perpendicular to the partition plate 9, so as to insert the latches 14 of the partition assembly 15 into the slots of the partition plate 9 to form the partition device 150 as shown in FIG. 20.

Figure 21:
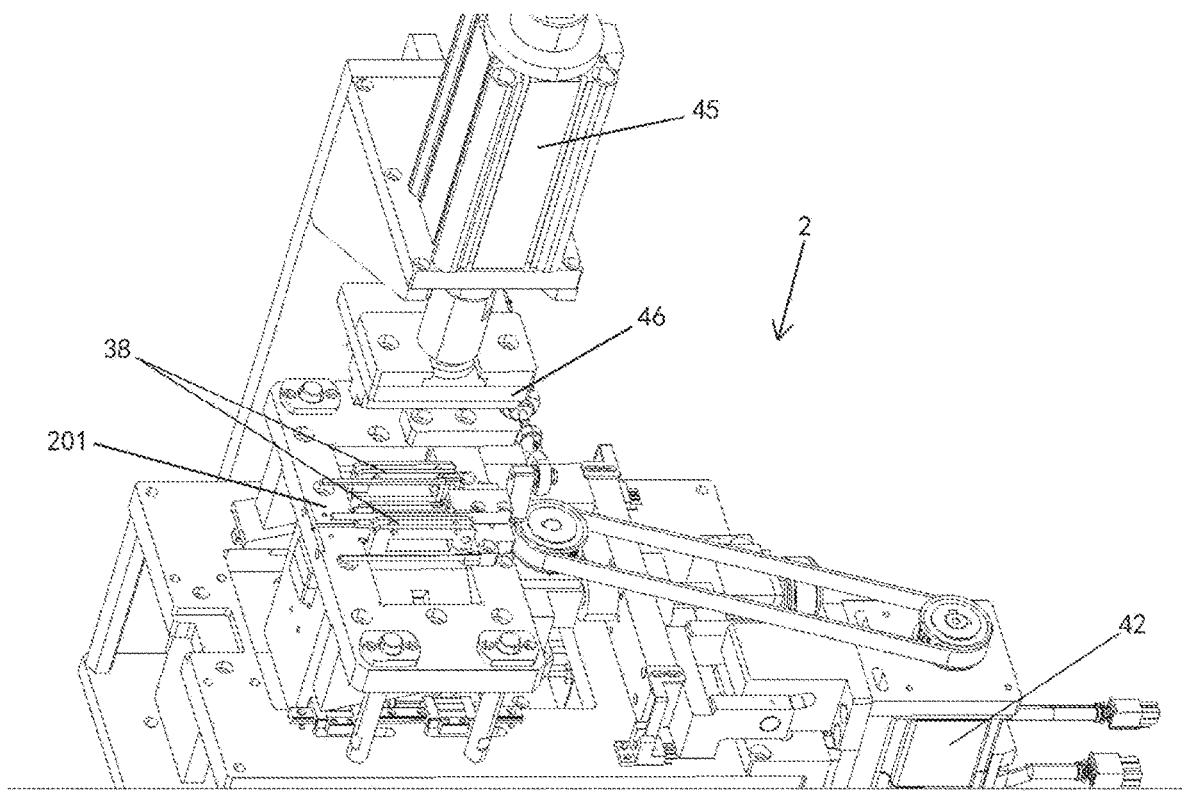
FIG. 21 is a perspective view of a second assembling workstation of the robot assembling system.

The second assembling workstation 2, as shown in FIG. 21, comprises a top case loading portion 201 configured to load the top case 10. As shown in FIGS. 23-27, the top case loading portion 201 includes four protruding pins 44 for positioning the top case 10. The second assembling workstation 2 further includes two bending mechanisms 38, between which a space for receiving the top case 10 is defined, configured to bend two sidewalls of the top case 10, a supporting device 46 configured to support the partition plate 9 of the partition device 150 from opposite sides of the top case 10, and a lifting device 49 configured to lift or lower the top case 10.

Figure 22:
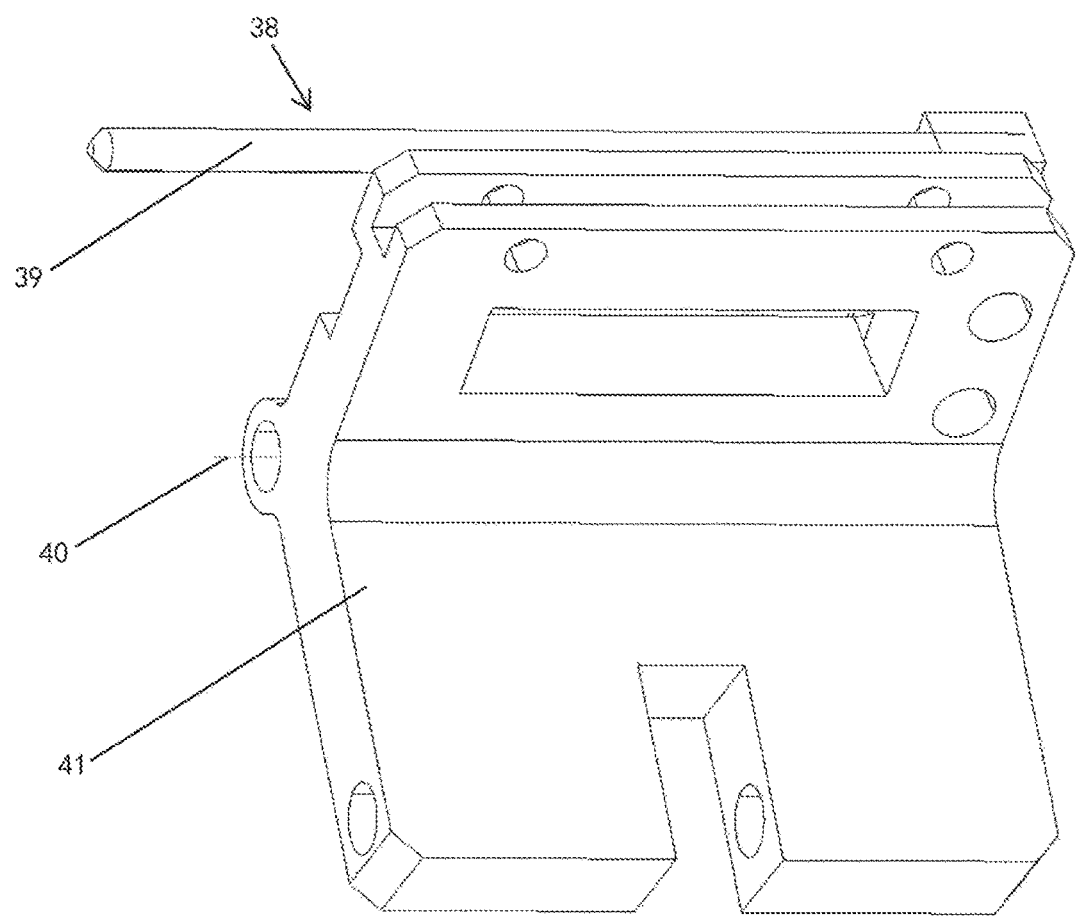
FIG. 22 is a perspective view of a bending mechanism of the second assembling workstation.
Figure 23:
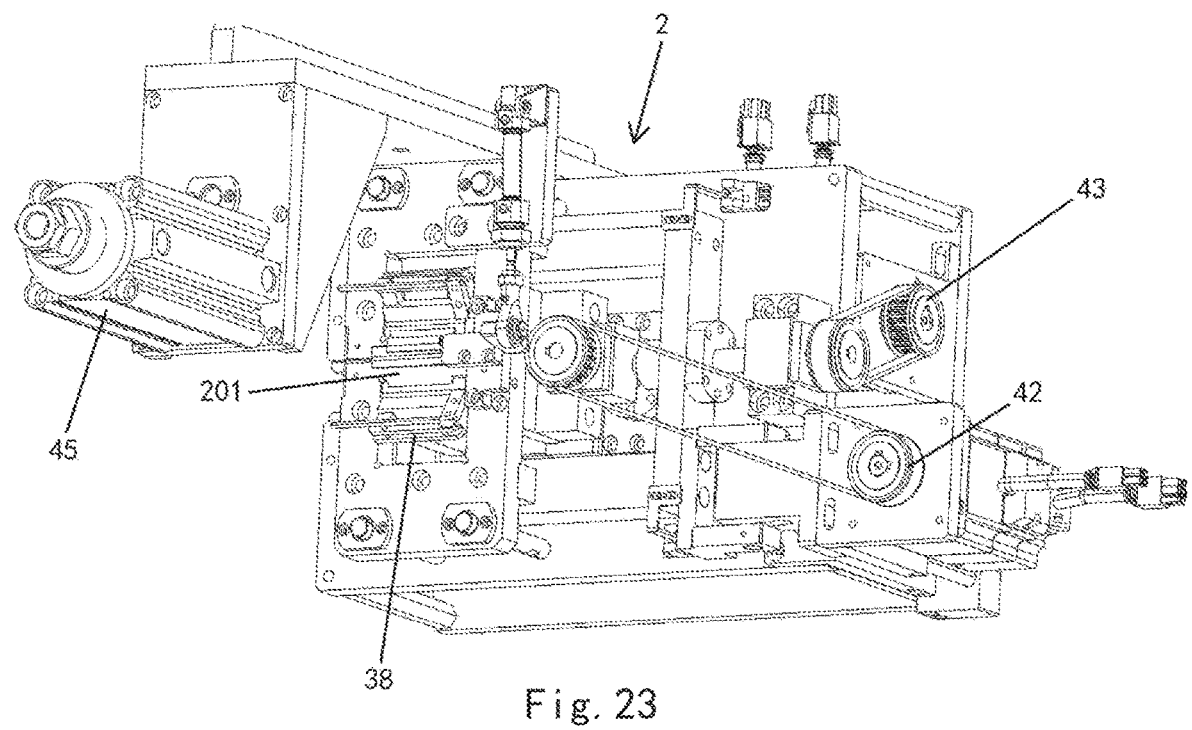
FIG. 23 is a perspective view of the bending mechanism of the second assembling workstation in an opened state.

Each bending mechanism 38, as shown in FIG. 22, includes a frame 41 configured to be rotatable about its pivotal axis and a holding member 39 adapted to be engaged to the sidewall of the top case 10, so that the sidewall of the top case 10 is rotated with the frame 41 and bent. In an embodiment, the holding member 39 may comprise a pin or a frame member.

Figure 26:
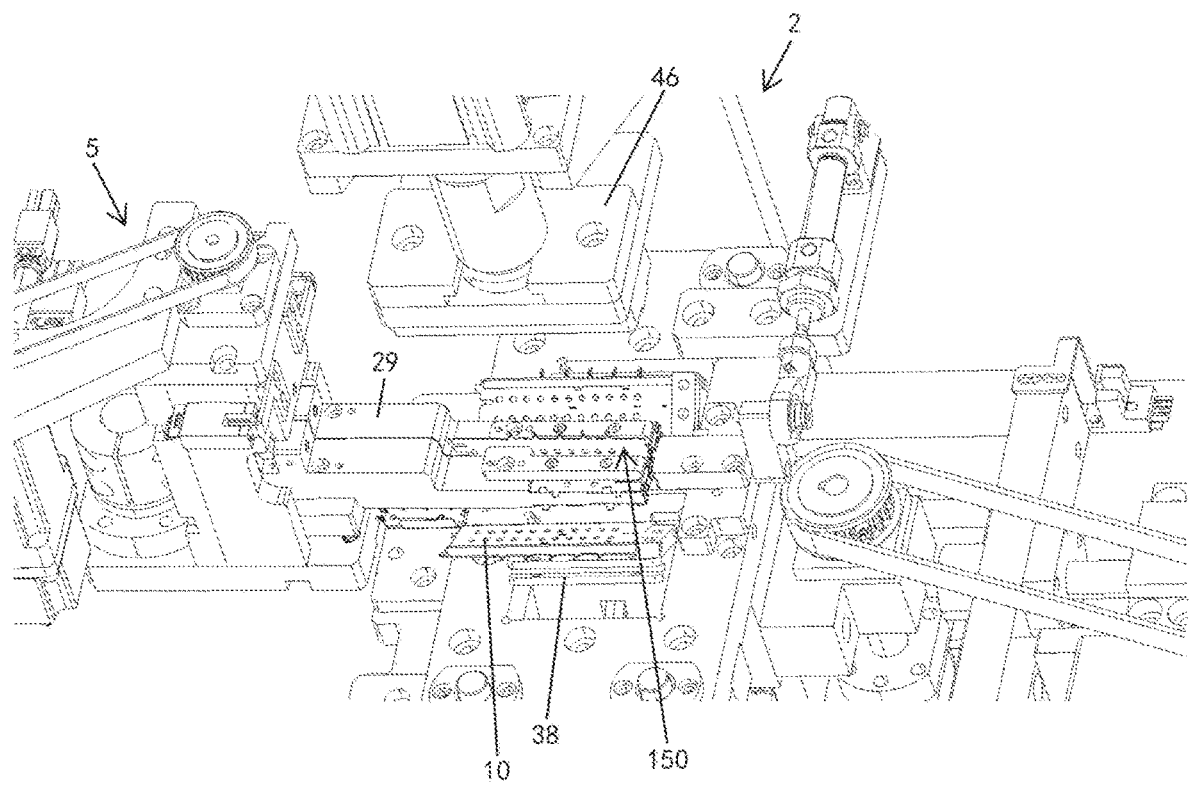
FIG. 26 is a perspective view of loading the partition device on the second assembling workstation with the fingers of the second robot.
Figure 27:
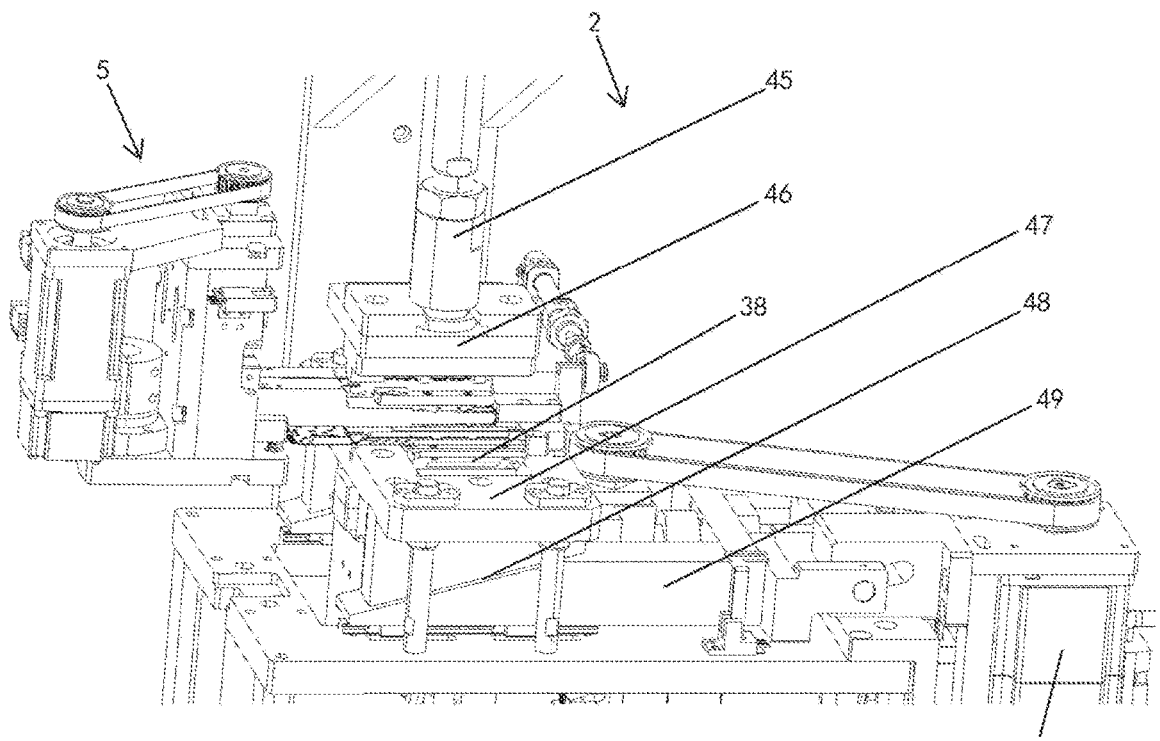
FIG. 27 is a perspective view of assembling the partition device and the top case on the second assembling workstation.
Figure 28:
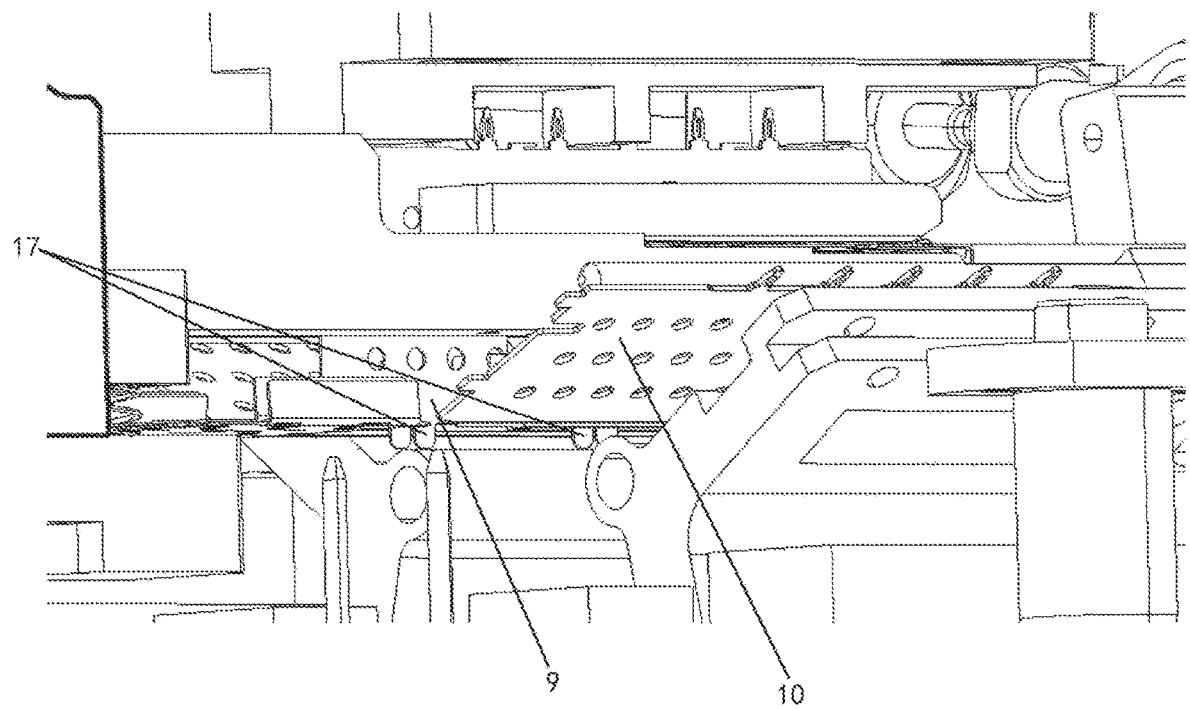
FIG. 28 is a perspective view of inserting protrusions of the partition plate into slots of the top plate of the top case.

As shown in FIGS. 26-28, in a condition where the two sidewalls of the top case 10 are driven to the opened state by the bending mechanisms 38 and where the partition device 150 is located above the top case 10, the lifting device 49 drives the top case 10 to move toward the supporting device 46, so as to engage the slots formed in the top wall of the top case 10 to the protrusions 17 on the bottom side of the partition plate 9. The bending mechanisms 38 then release the two sidewalls of the top case 10, so that the two sidewalls of the top case 10 are moved toward each other and are engaged to the partition device 150, so as to form the top case assembly 100.

In an embodiment, as shown in FIGS. 26-27, the second assembling workstation 2 includes a third driving device 45 configured to drive the supporting device 46 to move toward or away from the partition plate 9 and a fourth driving device 43 configured to drive the lifting device 49. In an embodiment, the third driving device 45 is an air cylinder and the fourth driving device 43 is a servo motor. As shown in FIG. 27, the lifting device 49 is a sliding frame. The sliding frame may drive the working table 47 to move up and down with the aid of an inclined contact surface 48 under the driving of the servo motor 43.

Figure 29:
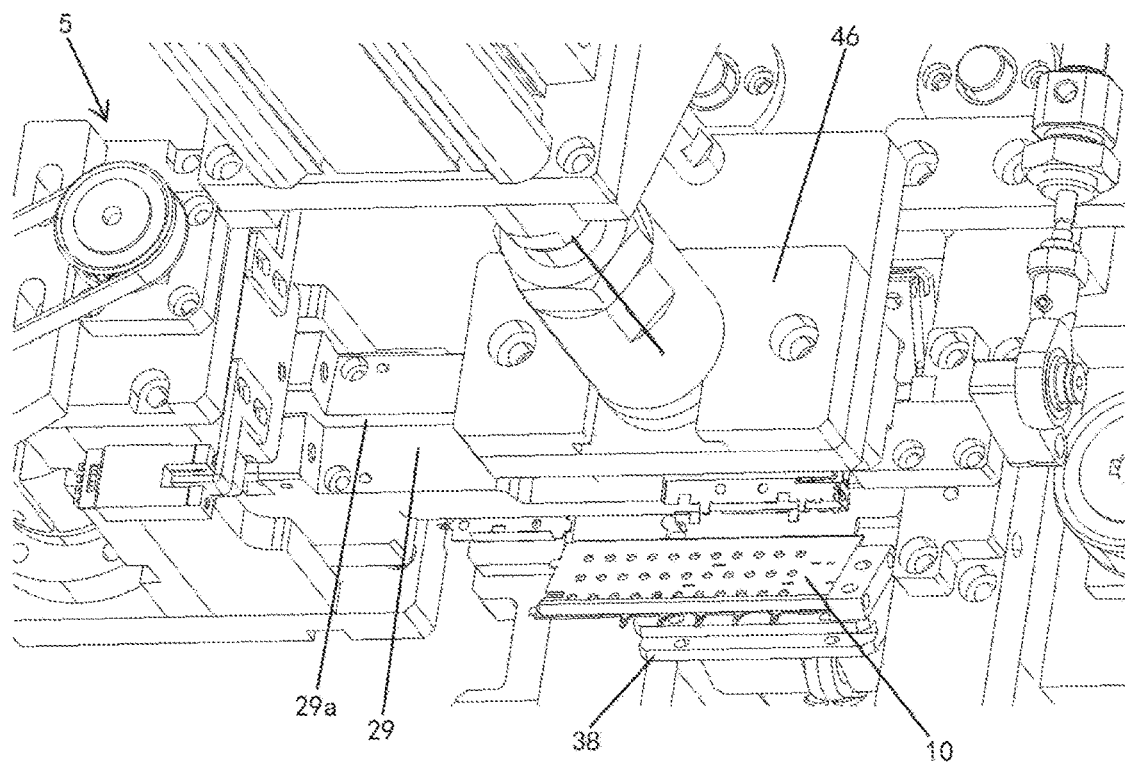
FIG. 29 is a perspective view of the fingers of the second robot opened by an angle.
Figure 30:
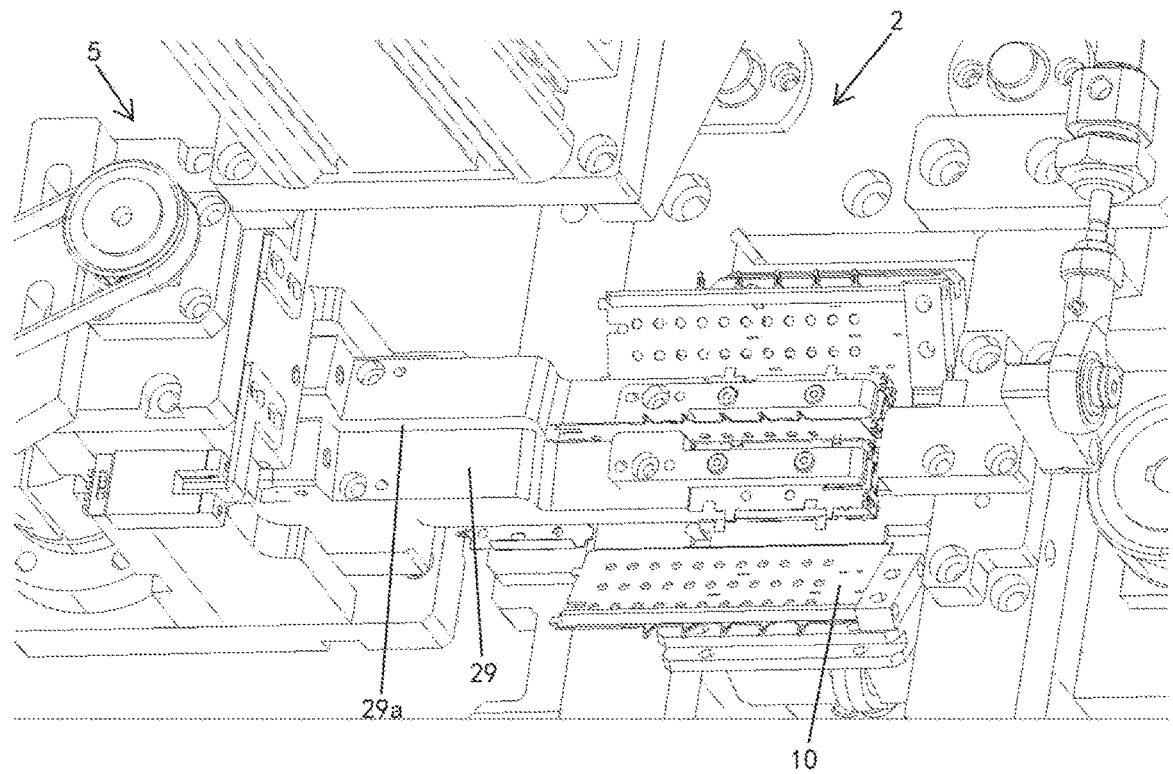
FIG. 30 is another perspective view of the fingers of the second robot opened by an angle.
Figure 31:
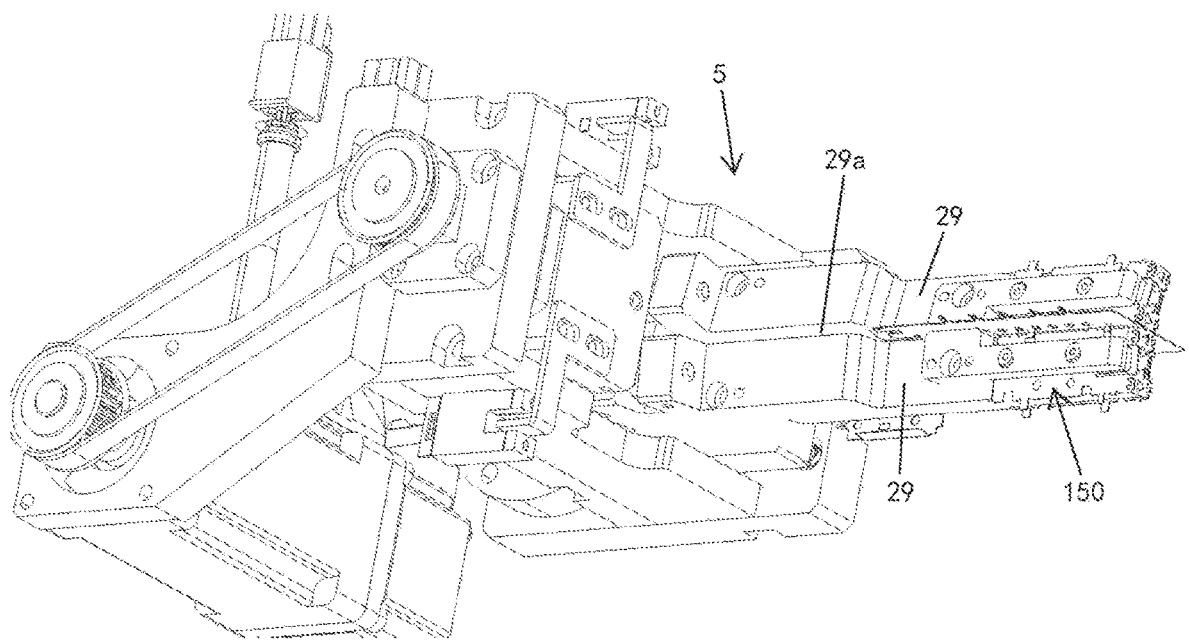
FIG. 31 is a perspective view of the fingers of the second robot with the partition device mounted on the fingers.

As shown in FIGS. 29-31, during engaging the top case 10 to the partition device 150, the partition device 150 is assembled on the fingers 29 of the second robot 5. During engaging the sidewalls of the top case 10 to the partition assembly 15, the fingers 29 are adapted to be pivotally opened, so that the partition assembly 15 is inclined by an angle, so as to facilitate engaging the slots formed in the sidewalls of the top case 10 to the latches 16 on the partition assembly 15.

The assembly process on the second assembling workstation 2 will now be described in greater detail.

Figure 24:
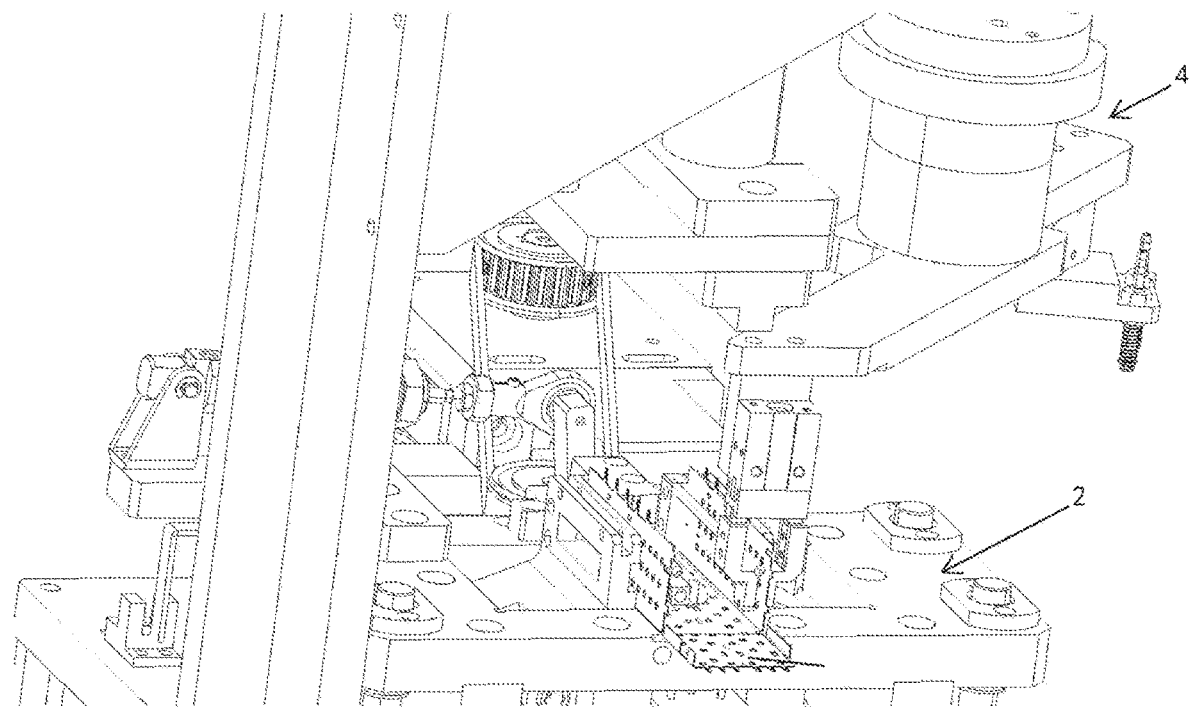
FIG. 24 is a perspective view of a top case loaded on the second assembling workstation by the first robot.
Figure 25:
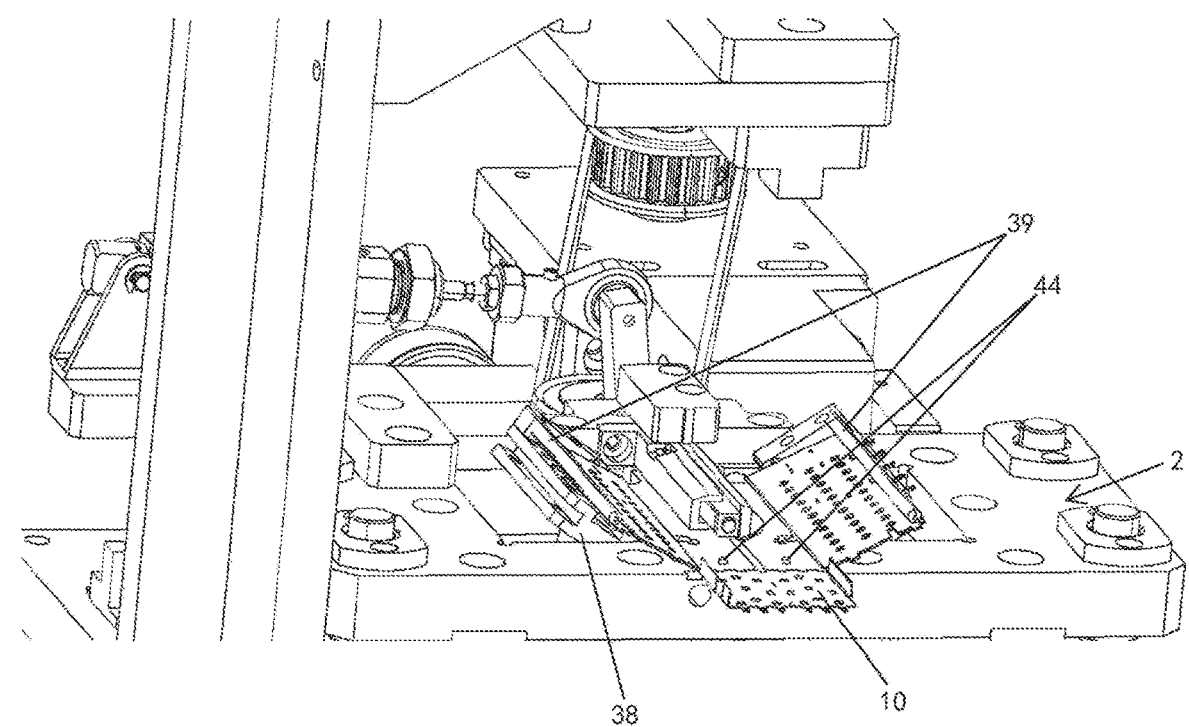
FIG. 25 is a perspective view of bending sidewalls of the top case with the bending mechanism.

First, as shown in FIG. 24, when the bending mechanism 38 is in the closed state, the first robot 4 loads the top case 10 to the loading portion 201 on the second assembling workstation. As shown in FIG. 25, the two positioning pins 44 on the loading portion 201 are inserted into holes formed in the top wall of the top case under the driving of the air cylinder, so as to fix the top case 10. The bending mechanism 38 is then opened by the driving of the servo motor.

As shown in FIG. 26, when the bending mechanism 38 is driven to reach the opened position, the griper 50 of the second robot 5 loads the partition device 150 onto the second assembling workstation 2 with the fingers 29. The third driving device 45 drives the supporting device 46, for example, in a form of a pressing block, to move toward the partition plate 9, so that the supporting device 46 is pressed against the top side of the partition plate 9.

Then, as shown in FIGS. 27 and 28, the sliding frame served as the lifting device 49 drives the working table 47 to move up with the aid of an inclined contact surface 48 under the driving of the servo motor 43, so as to insert the protrusion 17 on the bottom side of the partition plate 9 into the slot formed in the bottom wall of the top case 10.

Then, as shown in FIGS. 29-31, the fingers 29 of the second robot 5 are rotated and opened by a certain angle, so that the partition assembly 15 is inclined by the angle. In this condition, the bending mechanism 38 releases the two sidewalls of the top case 10. During releasing the sidewalls, the latches 16 formed on the outer side of the partition assembly 15 are inserted into the slots 18 formed in the two sidewalls of the top case 10, respectively. The inclination angle of the partition assembly 15 will facilitate smoothly inserting the latches 16 into the slots.

Figure 32:
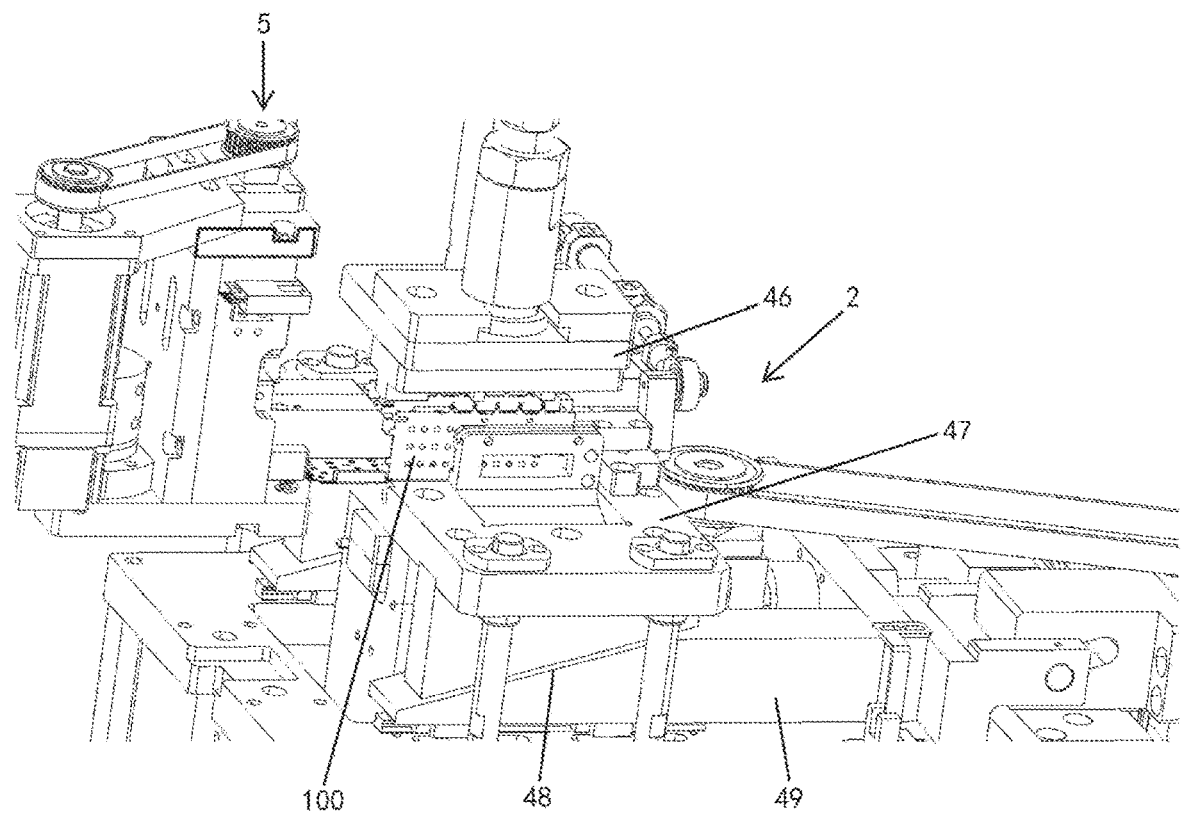
FIG. 32 is a perspective view of the partition device and the top case assembled together on the second assembling workstation.

The partition device 150 and the top case 10 are shown assembled on the second assembling workstation 2 in FIG. 32. As shown in FIG. 32, after the bending mechanism 38 is closed, the partition device 150 and the top case 10 are assembled to the top case assembly 100. As shown in FIG. 32, after assembling the partition device 150 and the top case 10 to the top case assembly 100 on the second assembling workstation 2, the robot 5 removes the top case assembly 100 from the loading location of the second assembling workstation 2 with its fingers 29, and transmits the top case assembly 100 to the third assembling workstation 3 for the next assembling operation.

Figure 33:
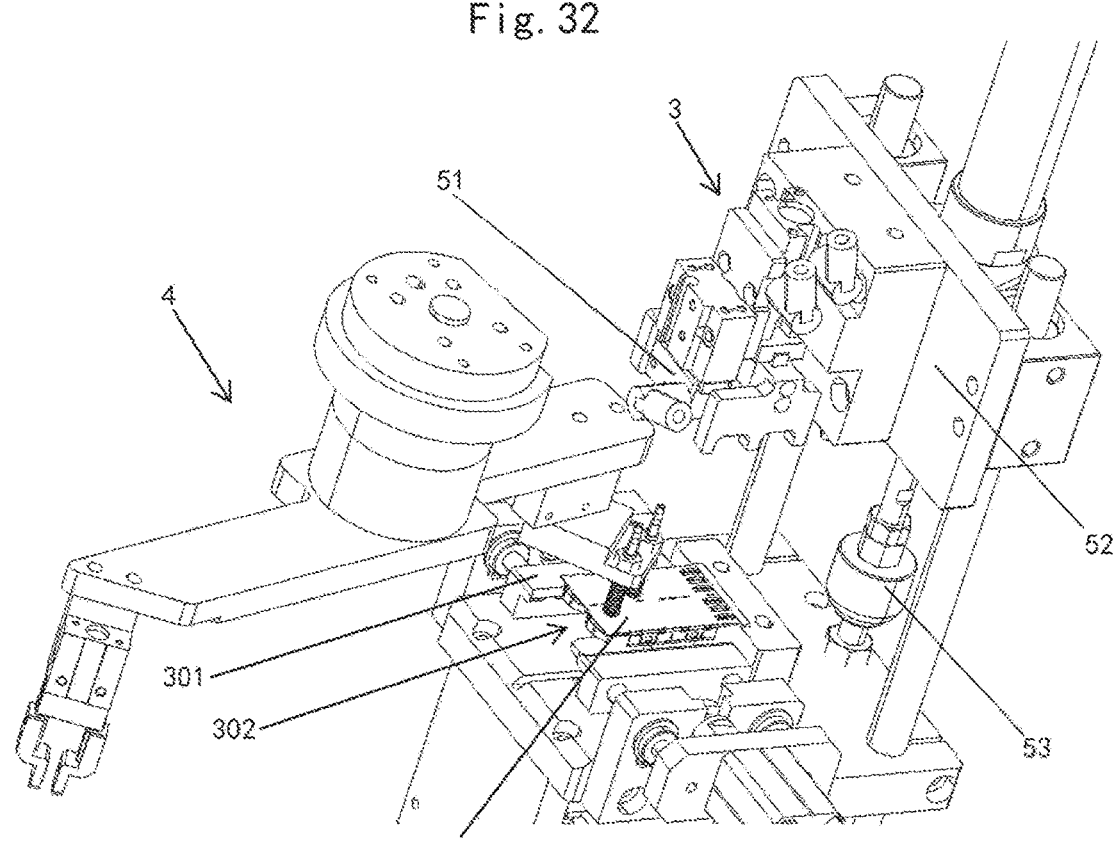
FIG. 33 is a perspective view of loading a bottom case on a third assembling workstation with the first robot.
Figure 34:
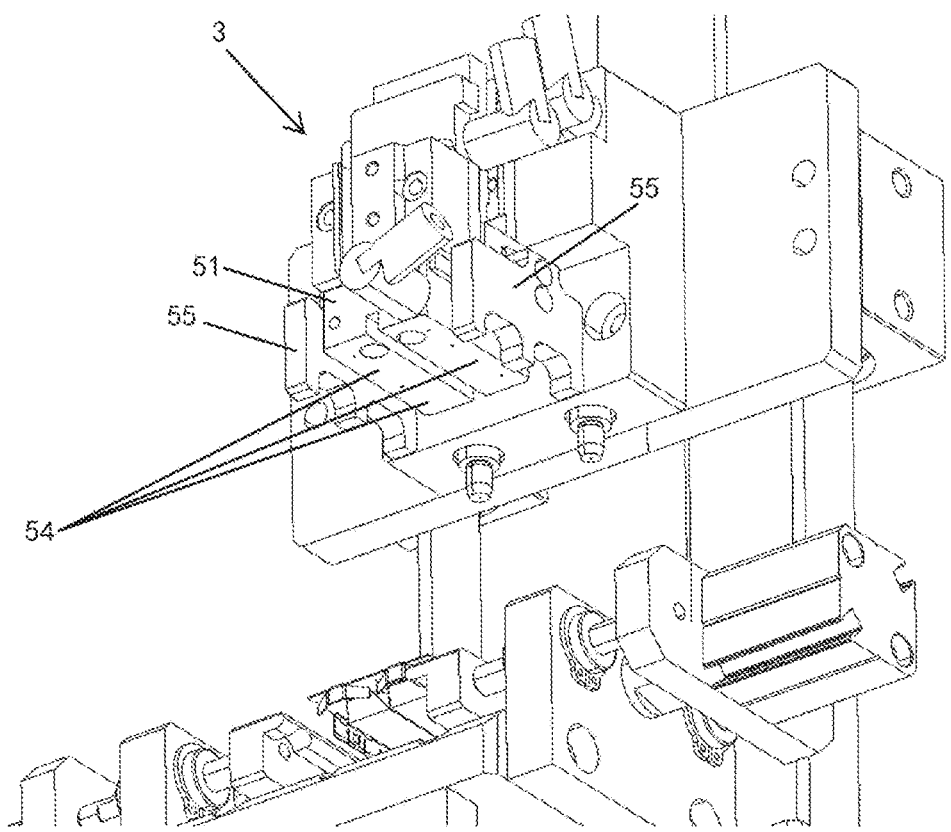
FIG. 34 is a perspective view of an air claw of the third assembling workstation.

Loading the bottom case 11 on the third assembling workstation 3 by the first robot 4 is shown in FIG. 33. The third assembling workstation 3, as shown in FIG. 33, includes a bottom case loading portion 301 configured to load the bottom case 11, a receiving portion 302 configured to receive the top case assembly 100, and a suction device 51 adapted to suck up the bottom case 11 and configured to be movable up and down, so as to drive the bottom case 11 to engage with the partition plate 9 and the sidewalls of the top case assembly 100, and form the multi-layer cage as shown in FIG. 2. As shown in FIG. 34, the suction device 51 may comprise an air claw. The air claw of the suction device 51 may be movable up and down by the sliding frame 52.

Figure 35:
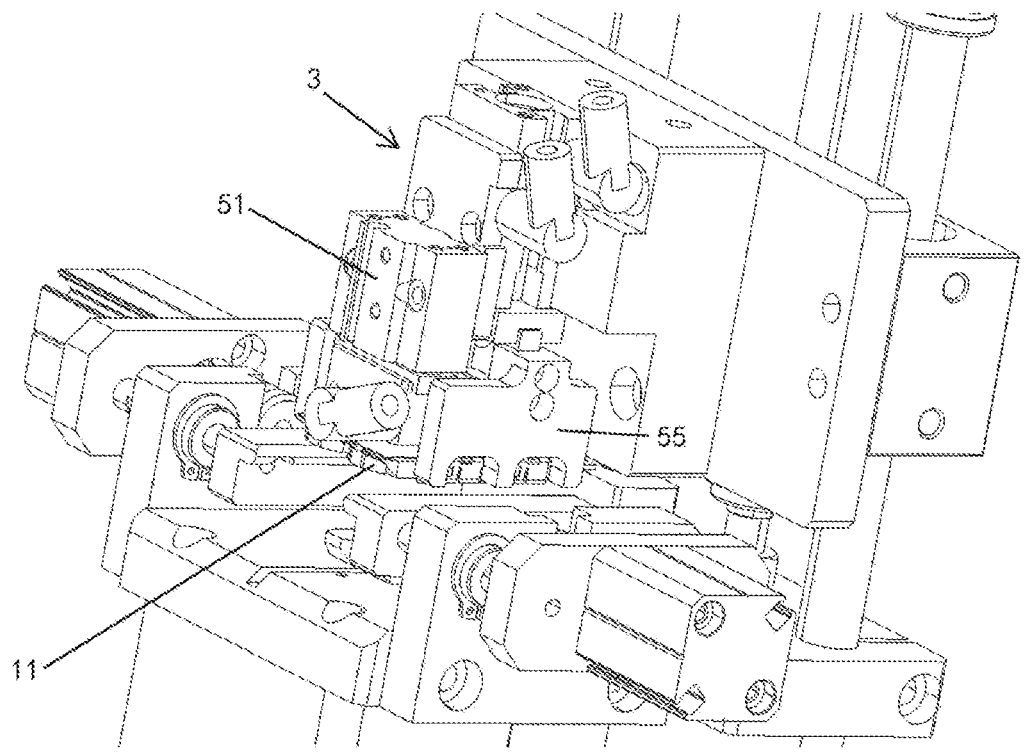
FIG. 35 is a perspective view of the air claw attached to the bottom case.
Figure 36:
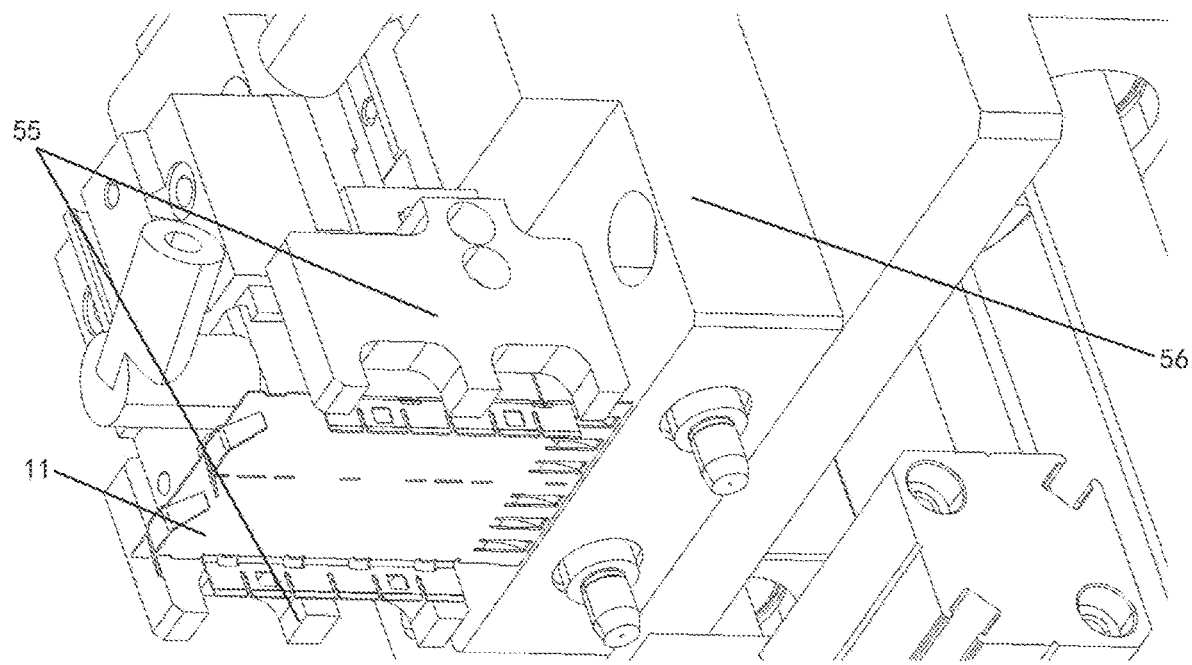
FIG. 36 is a perspective view of the air claw.

As shown in FIGS. 34-36, the suction device 51 includes a plurality of vacuum suction nozzles 54 configured to suck up the bottom case 11 and two sliding blocks 55 located at both sides of the vacuum suction nozzle 54 and configured to be movable toward each other. The sliding blocks 55 clamp the bottom case 11 therebetween. In an embodiment, as shown in FIG. 36, the sliding frame 52 comprises a back plate 56 constructed to position the bottom case 11.

As shown in FIG. 33, the third assembling workstation 3 further comprises a fifth driving device 53 configured to drive the suction device 51 to move up and down by the sliding frame 52 and a sixth driving device configured to drive the two sliding blocks 55 to move toward each other. In an embodiment, the fifth driving device 53 and the sixth driving device are each an air cylinder.

Figure 37:
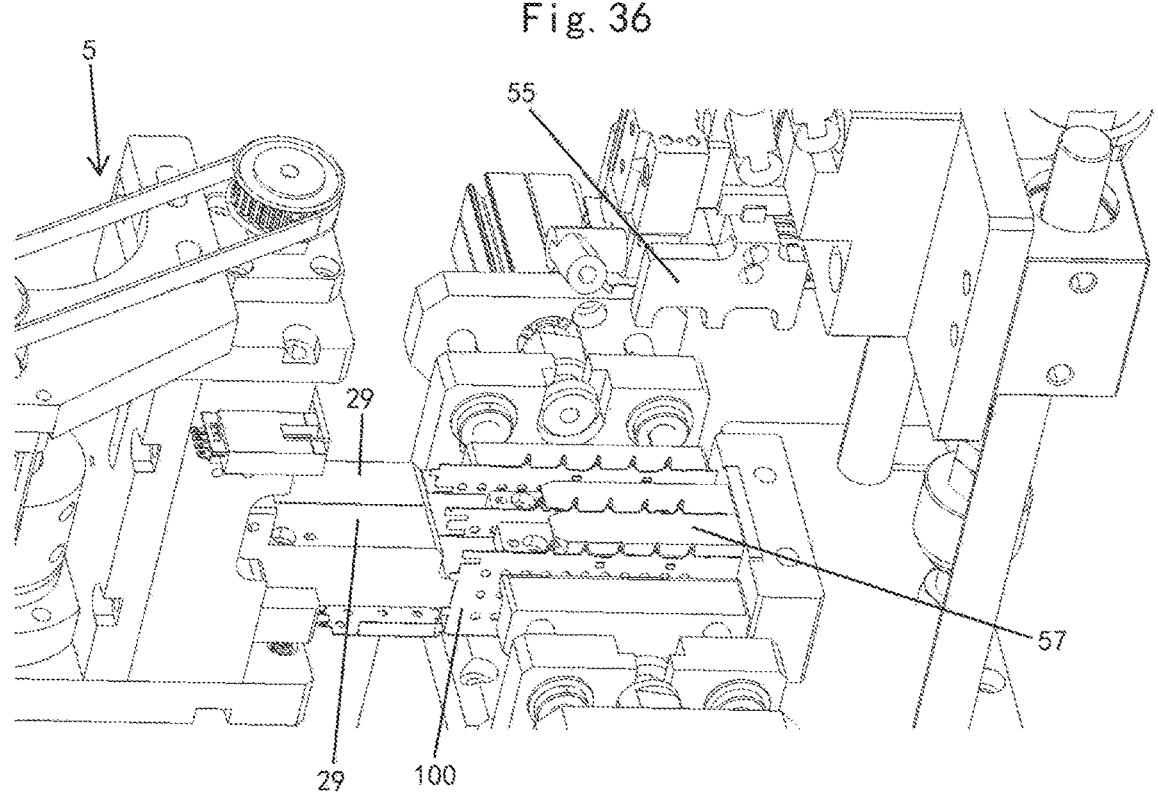
FIG. 37 is a perspective view of loading the top case assembly onto the third assembling workstation with the fingers of the second robot.
Figure 38:
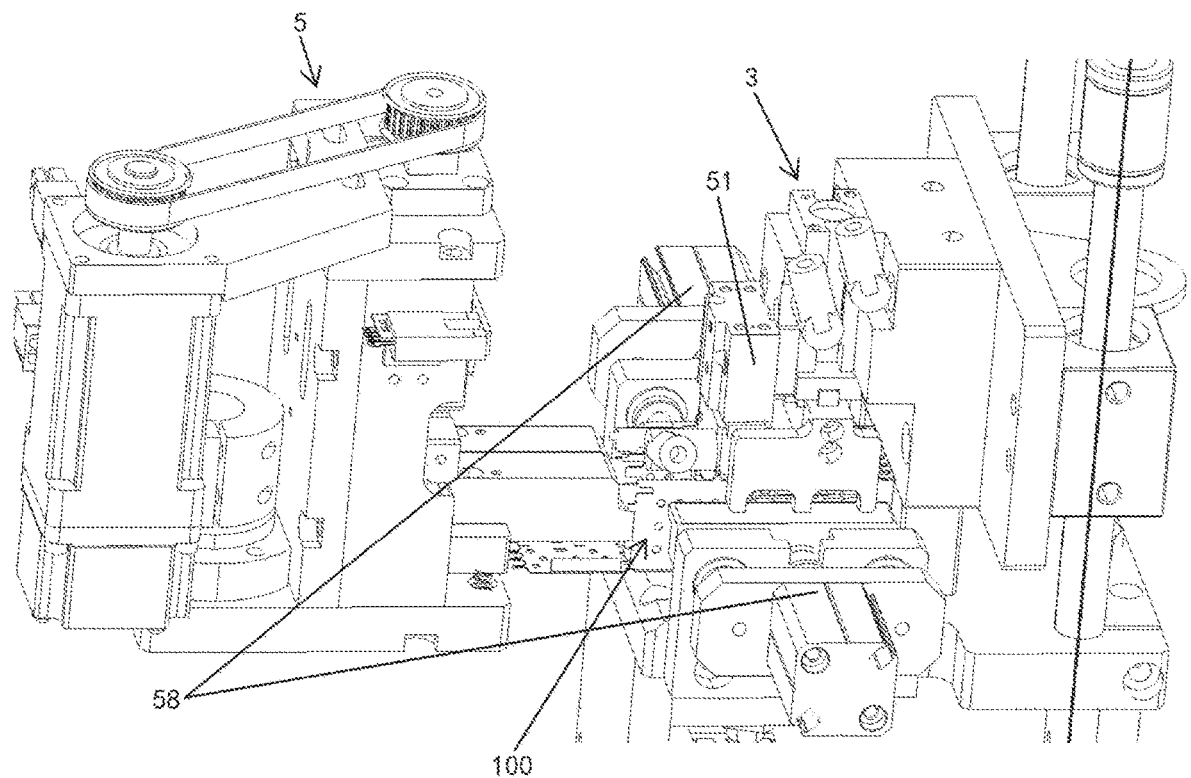
FIG. 38 is a perspective view of moving the bottom case to a position above the top case assembly with the air claw.
Figure 39:
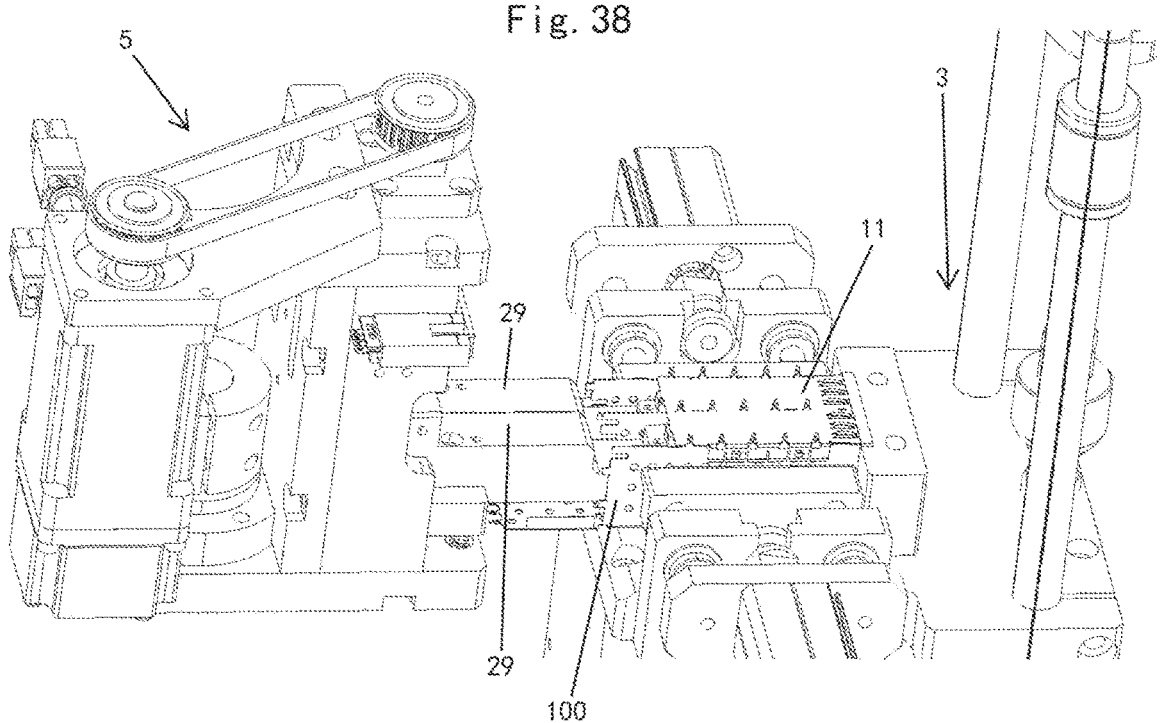
FIG. 39 is a perspective view of assembling the bottom case to the top case assembly on the third assembling workstation.

As shown in FIGS. 37-39, during engaging the bottom case 11 to the top case assembly 100, the top case assembly 100 is assembled to the fingers 29 of the second robot 5. In an embodiment, the fingers 29 are adapted to be pivotally opened when the bottom case is engaged to the partition plate 9 of the top case assembly 100, so that the partition assembly 15 is inclined by an angle, and the sidewalls of the top case 10 are opened outward, so as to avoid an interference between the bottom case 11 and the sidewalls of the top case 10. As shown in FIG. 38, the third assembling workstation 3 includes a seventh driving device 58 constructed to drive the opened sidewalls of the top case 10 to be moved toward each other, so as to engage the sidewalls of the top case 10 to the bottom case 11. In an embodiment, the seventh driving device 58 is an air cylinder.

An operation of assembling the multi-layer cage on the third assembling workstation 3 will now be described in greater detail below.

First, as shown in FIG. 33, the bottom case 11 is loaded on the loading portion 301 of the third assembling workstation 3 by the vacuum sucker 27 of the first robot 4. The loading portion 301 is provided with a loading plate 57 adapted to load the bottom case 11 and a slot adapted to position the partition plate 9.

Then, as shown in FIGS. 35-36, after the bottom case 11 is loaded on the loading location of the third assembling workstation 3, the air claw of the suction device 51 is moved downward, the vacuum suction nozzles 54 on the bottom surface of the air claw sucks up the bottom case 11. At this time, the sliding blocks 55 at both sides of the air claw are moved toward the center of the bottom case 11, so as to position and clamp the bottom case 11. In this condition, the suction device 51 sucks up the bottom case 11 and moves upward.

Then, as shown in FIG. 37, the gripper 50 of the second robot 5 loads the top case assembly 100 into the receiving portion of the third assembling workstation 3 with the fingers 29. The partition plate 9 is inserted into the slot of the receiving portion. At this time, pins of the partition plate 9 and the top case 10 are exposed out of the suction device 51.

During assembling the partition plate 9 to the bottom case 11, in order to avoid the interference between the bottom case 11 and the pins of the top case 10, the fingers 29 of the second robot 5 are rotated by a certain angle, so that the partition assembly 15 is inclined by a certain angle and pushes the sidewalls of the top case 10 to be slightly opened, so as to avoid the interference between the bottom case 11 and the pin of the top case 10. In this condition, as shown in FIG. 38, the suction device 51 sucks up the bottom case 11 and moves downward, so that the bottom case 11 is firstly engaged to the partition plate 9 of the top case assembly 100. Then, the fingers 29 are closed, and the seventh driving device 58 at both sides of the third assembling workstation 3 will drive and adjust the two sidewalls of the top case 10 to a vertical position. Then, the air claw of the suction device 51 continuously moves downward, so as to push the hook 19 of the bottom case 11 to engage with the clip 20 of the top case. Thus, the assembly of the whole multi-layer cage is completed.

A method of assembling a multi-layer cage by the above robot assembling system comprises steps of:

Loading the partition plate 9 and the partition assembly 15 onto the first assembling workstation 1 by the robot, and assembling the partition plate 9 and the partition assembly 15 on the first assembling workstation 1, so as to form the partition device 150.

Loading the top case 10 and the partition device 150 onto the second assembling workstation 2 by the robot, and assembling the top case 10 and the partition device 150 on the second assembling workstation 2, so as to form the top case assembly 100.

Loading the top case assembly 100 and the bottom case 11 onto the third assembling workstation 3 by the robot, and assembling the top case assembly 100 and the bottom case 11 on the third assembling workstation 3, so as to form the multi-layer cage.

In the above embodiments of the present invention, the robot assembling system and method for assembling the multi-layer cage realize automatic assembling of the multi-layer cage, which greatly improves the efficiency of assembling the multi-layer cage, saves labor cost, increases the assembly precision, and effectively avoids the interference among various components during assembly.

What is claimed is:

1. A robot assembling system for assembling a multi-layer cage including a bottom case, a top case, a partition plate, and a partition assembly, the robot assembling system comprising:
   a first assembling workstation configured to assemble the partition plate and the partition assembly to form a partition device;
   a second assembling workstation configured to assemble the partition device and the top case to form a top case assembly;
   a third assembling workstation configured to assemble the top case assembly and the bottom case to form the multi-layer cage; and
   a robot configured to transmit the bottom case, the top case, the partition plate, the partition assembly, the partition device, or the top case assembly between the first assembling workstation, the second assembling workstation, and the third assembling workstation, and configured to assist an assembly process at each of the first assembling workstation, the second assembling workstation, and the third assembling workstation.

2. The robot assembling system of claim 1, wherein the first assembling workstation includes:
   a partition plate loading portion configured to load the partition plate;
   a partition assembly loading portion configured to load the partition assembly; and
   a partition assembly driving device configured to drive the partition assembly to be engaged to the partition plate to form the partition device.

3. The robot assembling system of claim 2, wherein the partition plate loading portion includes a guide slot into which the partition plate is to be inserted and a push block configured to fix the partition plate in the guide slot by a spring, and the partition assembly driving device includes a first driving device configured to drive the partition assembly in a first direction parallel to the partition plate and a second driving device configured to drive the partition assembly in a second direction perpendicular to the first direction.

4. The robot assembling system of claim 3, wherein the robot includes a gripper adapted to hold the partition device, the gripper including a pair of fingers opposite to each other, a gap being defined between the fingers to receive the partition plate, the partition assembly is adapted to be sleeved on the fingers.

5. The robot assembling system of claim 4, wherein the fingers are configured to be rotatable relative to each other about a direction perpendicular to the fingers, so as to close or open the gap between the fingers.

6. The robot assembling system of claim 5, wherein the gripper includes a plurality of holding blocks located at both sides of each finger and adapted to elastically press the partition assembly on the finger when the partition assembly is sleeved on the finger.

7. The robot assembling system of claim 6, wherein each holding block includes a plurality of pins loaded by a plurality of springs and a sphere adapted to be pressed against the partition assembly by the springs.

8. The robot assembling system of claim 4, wherein the first assembling workstation includes a receiving portion located at both sides of the partition plate loading portion and receiving the fingers of the robot.

9. The robot assembling system of claim 5, wherein the second assembling workstation includes:
   a top case loading portion configured to load the top case;
   a pair of bending mechanisms, between which a space for receiving the top case is defined, the bending mechanisms configured to bend a pair of sidewalls of the top case;
   a supporting device configured to support the partition plate of the partition device from opposite sides of the top case; and
   a lifting device configured to lift or lower the top case, and in a condition in which the sidewalls of the top case are opened by the bending mechanisms and the partition device is located above the top case, the lifting device drives the top case to move toward the supporting device to engage the top case with the partition plate, and the bending mechanisms then release the sidewalls of the top case so that the sidewalls of the top case are driven to move toward each other and engage the partition device to form the top case assembly.

10. The robot assembling system of claim 9, wherein the partition device is assembled on the fingers of the robot when the top case engages the partition device, and the fingers are adapted to be pivotally opened when the sidewalls of the top case are engaged to the partition assembly so that the partition assembly is inclined by an angle, facilitating engaging the sidewalls of the top case to the partition assembly.

11. The robot assembling system of claim 1, wherein the second assembling workstation includes:
   a top case loading portion configured to load the top case;
   a pair of bending mechanisms, between which a space for receiving the top case is defined, the bending mechanisms configured to bend a pair of sidewalls of the top case;
   a supporting device configured to support the partition plate of the partition device from opposite sides of the top case; and
   a lifting device configured to lift or lower the top case, and in a condition in which the sidewalls of the top case are opened by the bending mechanisms and the partition device is located above the top case, the lifting device drives the top case to move toward the supporting device to engage the top case with the partition plate, and the bending mechanisms then release the sidewalls of the top case so that the sidewalls of the top case are driven to move toward each other and engage the partition device to form the top case assembly.

12. The robot assembling system of claim 11, wherein each of the bending mechanisms includes a frame configured to be rotatable about a pivotal axis and a holding member adapted to be engaged to the sidewall of the top case, so that the sidewall of the top case is rotated with the frame and bent.

13. The robot assembling system of claim 11, wherein the second assembling workstation includes:
   a third driving device configured to drive the supporting device to move toward or away from the partition plate; and
   a fourth driving device configured to drive the lifting device.

14. The robot assembling system of claim 13, wherein the third assembling workstation includes:
   a bottom case loading portion configured to load the bottom case;
   a receiving portion configured to receive the top case assembly; and a suction device adapted to attach to the bottom case and configured to be movable up and down so as to drive the bottom case to engage with the partition plate and a pair of sidewalls of the top case assembly to form the multi-layer cage.

15. The robot assembling system of claim 14, wherein the top case assembly is assembled on the fingers of the robot when the bottom case engages the top case assembly, and the fingers are adapted to be pivotally opened when the bottom case engages the partition plate so that the partition assembly is inclined by an angle and the sidewalls of the top case are opened outward.

16. The robot assembling system of claim 15, wherein the third assembling workstation includes:
   a fifth driving device configured to drive the suction device to move up and down;
   a sixth driving device configured to drive a pair of sliding blocks to move toward each other; and
   a seventh driving device configured to drive the opened sidewalls of the top case to move toward each other to engage the sidewalls of the top case with the bottom case.

17. The robot assembling system of claim 1, wherein the third assembling workstation includes:
   a bottom case loading portion configured to load the bottom case;
   a receiving portion configured to receive the top case assembly; and
   a suction device adapted to attach to the bottom case and configured to be movable up and down so as to drive the bottom case to engage with the partition plate and a pair of sidewalls of the top case assembly to form the multi-layer cage.

18. The robot assembling system of claim 17, wherein the suction device includes a plurality of vacuum suction nozzles configured to attach to the bottom case and a pair of sliding blocks located at both sides of the vacuum suction nozzles and configured to be movable toward each other to clamp the bottom case.

19. The robot assembling system of claim 18, wherein the third assembling workstation includes a fifth driving device configured to drive the suction device to move up and down and a sixth driving device configured to drive the sliding blocks to move toward each other.

20. A method of assembling a multi-layer cage by a robot assembling system, comprising:
   providing the robot assembling system including a first assembling workstation, a second assembling workstation, a third assembling workstation, and a robot;
   loading a partition plate and a partition assembly onto the first assembling workstation by the robot and assembling the partition plate and the partition assembly on the first assembling workstation to form a partition device;
   loading a top case and the partition assembly onto the second assembling workstation by the robot, and assembling the top case and the partition assembly on the second assembling workstation to form a top case assembly; and
   loading the top case assembly and a bottom case onto the third assembling workstation by the robot, and assembling the top case assembly and the bottom case on the third assembling workstation to form the multi-layer cage.

* * * * *